(12) United States Patent
Ibaragi et al.

(10) Patent No.: US 11,002,231 B2
(45) Date of Patent: May 11, 2021

(54) INTAKE DEVICE FOR INTERNAL COMBUSTION ENGINE

(71) Applicant: TOYOTA JIDOSHA KABUSHIKI KAISHA, Toyota (JP)

(72) Inventors: Tadashi Ibaragi, Nagoya (JP); Kazuaki Nakayama, Nagakute (JP); Ako Itoh, Toyota (JP); Ryuji Koike, Nagakute (JP); Toshiyuki Kondo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/929,149

(22) Filed: Oct. 1, 2019

(65) Prior Publication Data
US 2020/0124006 A1   Apr. 23, 2020

(30) Foreign Application Priority Data

Oct. 17, 2018  (JP) .............................. JP2018-195704
Jul. 31, 2019  (JP) .............................. JP2019-140608

(51) Int. Cl.
*F02M 35/10*       (2006.01)
*F02M 35/104*      (2006.01)
*F02M 35/116*      (2006.01)

(52) U.S. Cl.
CPC .. *F02M 35/1045* (2013.01); *F02M 35/10052* (2013.01); *F02M 35/10072* (2013.01); *F02M 35/10262* (2013.01); *F02M 35/116* (2013.01)

(58) Field of Classification Search
CPC .......... F02M 35/116; F02M 35/10039; F02M 35/10262; F02M 35/104; F02B 27/006
See application file for complete search history.

(56) References Cited

U.S. PATENT DOCUMENTS

| | | | | |
|---|---|---|---|---|
| 5,186,126 A | * | 2/1993 | Tarekado | .................. F02D 9/10 123/184.44 |
| 5,970,963 A | * | 10/1999 | Nakase | .............. F02M 35/1211 123/184.21 |
| 7,201,129 B2 | * | 4/2007 | Ohba | ..................... F02M 35/04 123/184.21 |
| 8,573,175 B2 | * | 11/2013 | Wakamatsu | ............ F02D 9/104 123/184.56 |

(Continued)

FOREIGN PATENT DOCUMENTS

| | | |
|---|---|---|
| JP | 2009-203966 A | 9/2009 |
| JP | 2016-156350 A | 9/2016 |

*Primary Examiner* — Long T Tran
(74) *Attorney, Agent, or Firm* — Oblon, McClelland, Maier & Neustadt, L.L.P.

(57) ABSTRACT

An intake device for an internal combustion engine configures a flow passage for intake air that is drawn into combustion chambers. The intake device includes an intake manifold configuring multiple runners that respectively distribute intake air to multiple cylinders, a surge tank including a cavity that is connected to the runners and defines a convergence portion, a throttle body incorporating a throttle valve, and a connection pipe connecting the surge tank and the throttle body and configuring a curved flow passage extending between the throttle body and the surge tank. The connection pipe includes a partition plate that divides the curved flow passage into a circumferentially inner flow passage and a circumferentially outer flow passage.

11 Claims, 7 Drawing Sheets

(56) References Cited

U.S. PATENT DOCUMENTS

| | | | |
|---|---|---|---|
| 2009/0101099 A1* | 4/2009 | Miyaji | F02M 35/10354 123/184.31 |
| 2009/0235890 A1* | 9/2009 | Maeda | F02B 31/08 123/184.53 |
| 2014/0116377 A1* | 5/2014 | Ishii | F02M 35/10347 123/336 |
| 2015/0184581 A1* | 7/2015 | Nakasugi | F02M 35/10268 123/563 |
| 2015/0267654 A1* | 9/2015 | Kato | F02M 35/1036 123/184.56 |

* cited by examiner

INTAKE DEVICE FOR INTERNAL COMBUSTION ENGINE

1. FIELD

The following description relates to an intake device for an internal combustion engine.

2. DESCRIPTION OF RELATED ART

An intake device for an internal combustion engine having multiple cylinders includes an intake manifold that distributes intake air to each cylinder. A surge tank is provided at an upstream side of the intake manifold to temporarily store the intake air.

Japanese Laid-Open Patent Publication No. 2016-156350 discloses an intake device for an internal combustion engine. The intake device includes a connection pipe connecting the surge tank to a throttle body arranged at an upstream side of the surge tank. The flow of intake air that has passed through the throttle body is curved by the connection pipe, and the intake air is drawn into the surge tank.

When intake air flows through a flow passage that is curved like the above connection pipe, the flow of the intake air may be separated from the inner wall of the connection pipe. More specifically, the flow of the intake air may be separated from a wall surface of the flow passage located at an inner circumferential side of a curved portion of the flow passage, and the flow of the intake air may concentrate on an outer circumferential side of the curved portion. If separation of the flow of intake air flowing through the connection pipe disturbs the flow of the intake air when flowing into the surge tank, pressure loss in the surge tank may be increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of an intake device is used for an internal combustion engine that includes multiple cylinders and configures a flow passage for intake air that is drawn into combustion chambers of the internal combustion engine. The intake device includes an intake manifold configuring multiple runners that distribute intake air to each of the multiple cylinders, a surge tank including a cavity that is connected to the runners and defines a convergence portion, a throttle body incorporating a throttle valve, and a connection pipe connecting the surge tank and the throttle body and configuring a curved flow passage extending between the throttle body and the surge tank. The connection pipe includes a partition plate that divides the curved flow passage into a circumferentially inner flow passage and a circumferentially outer flow passage.

In the above configuration, the partition plate guides intake air flowing through the connection pipe. This limits separation of intake air flowing through the connection pipe from the inner wall of the connection pipe and concentration of the intake air on the circumferentially outer side of the curved flow passage. More specifically, disturbance of the flow of intake air flowing through the connection pipe into the surge tank is limited. This limits increases in pressure loss in the surge tank.

In an example of the intake device, each of the runners includes a connection portion connected to the convergence portion. The connection portions are spaced apart from each other in an extension direction of a rotation axis of a crankshaft of the internal combustion engine. The connection pipe includes a straight portion connected to an end of the surge tank in the extension direction of the rotation axis and extending in the extension direction of the rotation axis. The partition plate includes a terminal portion extending in the extension direction of the rotation axis and located at an end of the connection pipe that is located adjacent to the surge tank. The terminal portion is located in the straight portion.

In the above configuration, the terminal portion of the partition plate is located in the straight portion of the connection pipe connected to the surge tank. In the same manner as the straight portion of the connection pipe, the terminal portion of the partition plate extends in the extension direction of the rotation axis of the crankshaft. Thus, intake air that is drawn into the surge tank is guided to flow in the extension direction of the rotation axis. More specifically, while limiting disturbance of the flow of intake air flowing through the connection pipe into the surge tank, the intake air is directed in the extension direction of the rotation axis and drawn into the surge tank. Thus, the intake air readily flows into the runner that is connected to the surge tank at the position farthest from the portion connected to the connection pipe.

In an example of the intake device, the internal combustion engine is a V-type internal combustion engine in which the multiple cylinders are separated into a first bank and a second bank and arranged in a V-shaped layout. The surge tank and the intake manifold are arranged between the first bank and the second bank. The flow passage in the connection pipe is curved toward the first bank at an upstream side of the straight portion. The runners include a first bank runner and a second bank runner. The first bank runner is connected to the convergence portion at a position closer to the first bank than a portion of the surge tank connected to the connection pipe and distributes intake air to one of the cylinders in the first bank. The second bank runner is connected to the convergence portion at a position closer to the second bank than the portion of the surge tank connected to the connection pipe and distributes intake air to one of the cylinders in the second bank.

If the connection pipe does not include a partition plate, the flow of intake air concentrates on the circumferentially outer side of the curved flow passage in the connection pipe. This hinders the intake air from flowing into the first bank runners, particularly, the first bank runner that is located closest to the straight portion of the connection pipe. However, when a partition plate is provided, concentration of the flow of intake air on the circumferentially outer side of the curved flow passage is reduced. Thus, intake air readily flows to the first bank runners as compared to when a partition plate is not provided.

In an example of the intake device, the throttle valve is a butterfly valve and includes a rotation shaft. When the rotation shaft of the throttle valve is projected along the flow passage for intake air onto an end of the partition plate that is opposed to the throttle valve, a projection line of the rotation shaft intersects with the end of the partition plate.

The butterfly valve is configured so that the valve member rotates about the rotation shaft, and the valve member opens at opposite sides of the rotation shaft toward the upstream side and the downstream side. Thus, flow of intake air flowing through the portion of the valve member that is open toward the upstream side may differ from flow of intake air flowing through the portion of the valve member that is open toward the downstream side.

When the throttle valve and the partition plate are arranged so that the projection line of the rotation shaft of the throttle valve intersects with the end of the partition plate, both intake air that has passed through the portion of the valve member open toward the upstream side and intake air that has passed through the portion of the valve member open toward the downstream side readily flow into each flow passage divided by the partition plate as compared to when the projection line of the rotation shaft coincides with the end of the partition plate or is parallel to the end of the partition plate. Thus, as intake air flows through the connection pipe, the difference between the flow of intake air that has passed through the portion of the valve member open toward the upstream side and the flow of intake air that has passed through the portion of the valve member open toward the downstream side is reduced, and the intake air is drawn into the surge tank. In the above configuration, concentration of flow of intake air caused by the intake air flowing through the throttle body is reduced when the intake air flows through the connection pipe. This limits disturbance of the intake air in the surge tank.

In an example of the intake device, the throttle valve includes a circular valve member. The projection line of the rotation shaft is orthogonal to the end of the partition plate.

In the above configuration, the partition plate equally divides the flow of intake air that has passed through the portion of the valve member open toward the upstream side and the flow of intake air that has passed through the portion of the valve member open toward the downstream side and allows the intake air to flow into each flow passage divided by the partition plate.

In an example of the intake device, the throttle valve is a butterfly valve. When the flow passage in the connection pipe is divided into two regions, which are a first pipe inner region and a second pipe inner region excluding the first pipe inner region, by an imaginary plane that intersects with the partition plate, the first pipe inner region is a region in which when opening the throttle valve from a fully-closed state, a valve member of the throttle valve is inclined toward an upstream side of the flow passage for intake air. In the first pipe inner region, in a range of a specified dimension from an end of the partition plate that is opposed to the throttle valve toward a downstream side of intake air, the partition plate divides the flow passage in the connection pipe into the circumferentially inner flow passage and the circumferentially outer flow passage.

When the butterfly valve starts to open and immediately before the butterfly valve closes, intake air that has passed through a portion of the valve member that is open toward the upstream side may flow faster than intake air that has passed through a portion of the valve member that is open toward the downstream side. Intake air that has passed through the throttle valve flows into a portion of the connection pipe in which the end of the partition plate opposed to the throttle valve is arranged. In the above configuration, in the range of the specified dimension from the end opposed to the throttle valve, into which intake air flows, the partition plate divides the first pipe inner region, in which intake air flows at high speeds, into the circumferentially inner flow passage and the circumferentially outer flow passage. Thus, the intake air flowing at high speeds is divided and guided into the circumferentially inner flow passage and the circumferentially outer flow passage by the partition plate. This limits disturbance of the flow of intake air flowing through the connection pipe.

In an example of the intake device, the throttle valve is a slide valve including a valve member including a valve hole. When the throttle valve is fully open, the throttle valve has a region in which the flow passage in the connection pipe is blocked by the valve member of the throttle valve and a region in which the flow passage in the connection pipe is not blocked by the valve member. When a boundary between the regions defines a boundary plane and the boundary plane is projected along the flow passage for intake air onto an end of the partition plate that is opposed to the throttle valve, a projection line of the boundary plane intersects with the end of the partition plate. The partition plate is connected to an inner wall of the connection pipe configuring a region of the flow passage that is not blocked by the valve member when the throttle valve is fully open. The partition plate includes a basal end connected to the inner wall and a distal end opposite to the basal end. In a range of the connection pipe having a specified dimension from the end of the partition plate that is opposed to the throttle valve toward a downstream side of intake air, a dimension of the partition plate from the basal end to the distal end is greater than a distance from the basal end to the projection line of the boundary plane in a direction connecting the basal end and the distal end.

The slide valve opens and closes, for example, when the planar valve member having a valve hole moves in a direction orthogonal to the center axis of the flow passage. Even when the slide valve is fully open, the valve member partially projects in the flow passage in the connection pipe. In this case, when the slide valve is fully open, the interior of the connection pipe is divided into a region in which the flow passages in the connection pipe are blocked by the valve member and a region in which the flow passages are not blocked by the valve member. The region in which the flow passages are not blocked by the valve member refers to a region in which the flow passages in the connection pipe are connected by the valve hole that is open in the valve member.

When the throttle valve is a slide valve and is in the fully open state, the valve member may partially project into the flow passage in the connection pipe. In this case, as in the above configuration, in the range of a specified dimension from the end of the partition plate opposed to the throttle valve, into which intake air flows, the partition plate may be set to have a dimension that is greater than the distance from the basal end of the partition plate to the projection line that projects the boundary plane between the regions. In this configuration, when the throttle valve is fully open, intake air flowing through the throttle valve is divided and guided into the circumferentially inner flow passage and the circumferentially outer flow passage by the partition plate. This limits disturbance of the flow of intake air flowing through the connection pipe.

In an example of the intake device, the throttle valve is a slide valve including a valve member including a valve hole. When the flow passage in the connection pipe is divided into two regions, which are a first pipe inner region and a second pipe inner region, by an imaginary plane that intersects with the partition plate and extends through a center axis of the connection pipe, the first pipe inner region is a region in which when the valve member is moved to open the throttle valve from a fully closed state, a flow passage located at an upstream side of the throttle valve starts to be connected to a flow passage located at a downstream side of the throttle valve. The second pipe inner region is a region opposite to the first pipe inner region with respect to the imaginary plane. In the first pipe inner region, in a range of a specified dimension from an end of the partition plate that is opposed to the throttle valve toward a downstream side of intake air, the flow passage in the connection pipe is divided by the partition plate into the circumferentially inner flow passage and the circumferentially outer flow passage.

When opening the throttle valve, which is a slide valve, from the fully-closed state and immediately before closing the throttle valve, intake air flows through a small gap that connects the flow passage located at the upstream side of the throttle valve and the flow passage located at the downstream side of the throttle valve. Thus, the speed of the flow of intake air that has passed through the gap may be increased. In the above configuration, in the range of a specified dimension from the end of the partition plate opposed to the throttle valve, into which intake air flows, the partition plate divides the first pipe inner region, in which intake air may flow at high speeds, into the circumferentially inner flow passage and the circumferentially outer flow passage. Thus, intake air flowing at high speeds is divided and guided into the circumferentially inner flow passage and the circumferentially outer flow passage by the partition plate. This limits disturbance of the flow of intake air flowing through the connection pipe.

In an example of the intake device, the partition plate includes a basal end connected to an inner wall of the connection pipe configuring the first pipe inner region and a distal end opposite to the basal end. A dimension of the partition plate from the basal end to the distal end is less than an inner diameter of the connection pipe in a direction connecting the basal end and the distal end. The distal end of the partition plate is located in the second pipe inner region. In the second pipe inner region, in a range of a specified dimension from an end of the partition plate that is opposed to the throttle valve toward a downstream side of intake air, in the connection pipe, the circumferentially inner flow passage and the circumferentially outer flow passage located at opposite sides of the partition plate are connected to each other through a gap between an inner wall of the connection pipe and the distal end of the partition plate.

When the partition plate is shorter than the inner diameter of the connection pipe, a gap that is not divided by the partition plate into the circumferentially inner flow passage and the circumferentially outer flow passage is present. The gap connects the circumferentially inner flow passage and the circumferentially outer flow passage, which are located at opposite sides of the partition plate. In the above configuration, the gap connecting the circumferentially inner flow passage and the circumferentially outer flow passage, which are located at opposite sides of the partition plate, is located in a region in which the flow of intake air is relatively slow when opening the throttle valve or a region in which intake air does not readily flow when the throttle valve starts to open. Thus, even when the partition plate is short, the advantage of the partition plate limiting disturbance of intake air will not be reduced.

In an example of the intake device, the partition plate is a second partition plate. The second partition plate projects from the inner wall of the connection pipe configuring the first pipe inner region. The intake device further comprises a first partition plate projecting from an inner wall of the connection pipe configuring the second pipe inner region. The first partition plate includes a distal end opposed to the distal end of the second partition plate. The first partition plate and the second partition plate divide the curved flow passage in the connection pipe into a circumferentially inner flow passage and a circumferentially outer flow passage. The distal end of the first partition plate and the distal end of the second partition plate are located in the second pipe inner region. In the second pipe inner region, in a range of a specified dimension from an end of the partition plate that is opposed to the throttle valve toward a downstream side of intake air, in the connection pipe, the circumferentially inner flow passage and the circumferentially outer flow passage, which are located opposite sides of the first partition plate and the second partition plate, are connected to each other through a gap between the distal end of the first partition plate and the distal end of the second partition plate.

When the flow passage in the connection pipe is divided into the circumferentially inner flow passage and the circumferentially outer flow passage by the first partition plate and the second partition plate having ends opposed to each other, as in the above configuration, the gap connecting the circumferentially inner flow passage and the circumferentially outer flow passage, which are located at opposite sides of the partition plate, may be located in a region in which the flow of intake air is relatively slow when opening the throttle valve or a region in which intake air does not readily flow when the throttle valve starts to open.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of an intake device for an internal combustion engine, which is referred to as an intake device 10, will now be described with reference to FIGS. 1 to 4.

Figure 1:
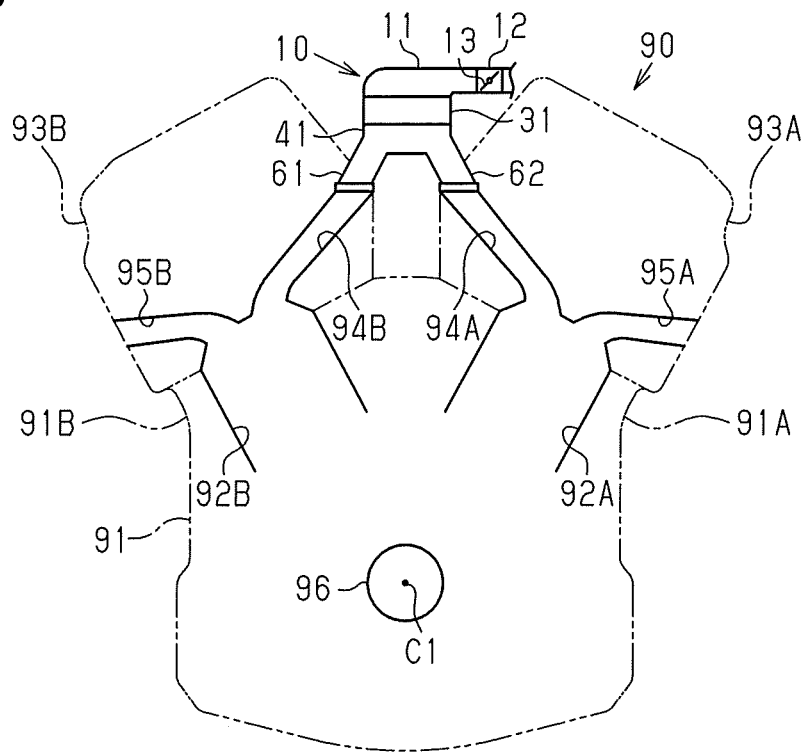
FIG. 1 is a schematic diagram showing an internal combustion engine including a first embodiment of an intake device for an internal combustion engine.

FIG. 1 shows an internal combustion engine 90 including the intake device 10. The internal combustion engine 90 includes a right cylinder group arranged on a right bank 91A of a cylinder block 91 and a left cylinder group arranged on a left bank 91B of the cylinder block 91. The right bank 91A and the left bank 91B are located at opposite sides of a crankshaft 96 of the internal combustion engine 90. In each of the right bank 91A and the left bank 91B, three cylinders are arranged in an extension direction of the rotation axis of the crankshaft 96. The cylinders having cylinder numbers of "#2," "#4," and "#6" and configuring the right cylinder group are arranged in the right bank 91A. The cylinders having cylinder numbers of "#1," "#3," and "#5" and configuring the left cylinder group are arranged in the left bank 91B. In FIG. 1, the rotation axis of the crankshaft 96 is indicated by axis C1. FIG. 1 shows a right cylinder 92A, which is one of the cylinders arranged on the right bank 91A. FIG. 1 also shows a left cylinder 92B, which is one of the cylinders arranged on the left bank 91B. The right bank 91A is inclined relative to the left bank 91B so that the right cylinder 92A and the left cylinder 92B are located closer to each other at positions closer to the crankshaft 96. The internal combustion engine 90 is a V-type internal combustion engine in which six cylinders are separated into the right bank 91A and the left bank 91B and arranged in a V-shaped layout.

A right cylinder head 93A is attached to the right bank 91A of the cylinder block 91. The right cylinder head 93A includes intake ports, which draw intake air into the respective cylinders in the right cylinder group, and exhaust ports, which discharge air-fuel mixture burned in the cylinders. FIG. 1 shows an intake port 94A and an exhaust port 95A that are connected to the right cylinder 92A.

A left cylinder head 93B is attached to the left bank 91B of the cylinder block 91. The left cylinder head 93B includes intake ports, which draw intake air into the respective cylinders in the left cylinder group, and exhaust ports, which discharge air-fuel mixture burned in the cylinders. FIG. 1 shows an intake port 94B and an exhaust port 95B that are connected to the left cylinder 92B.

Figure 2:
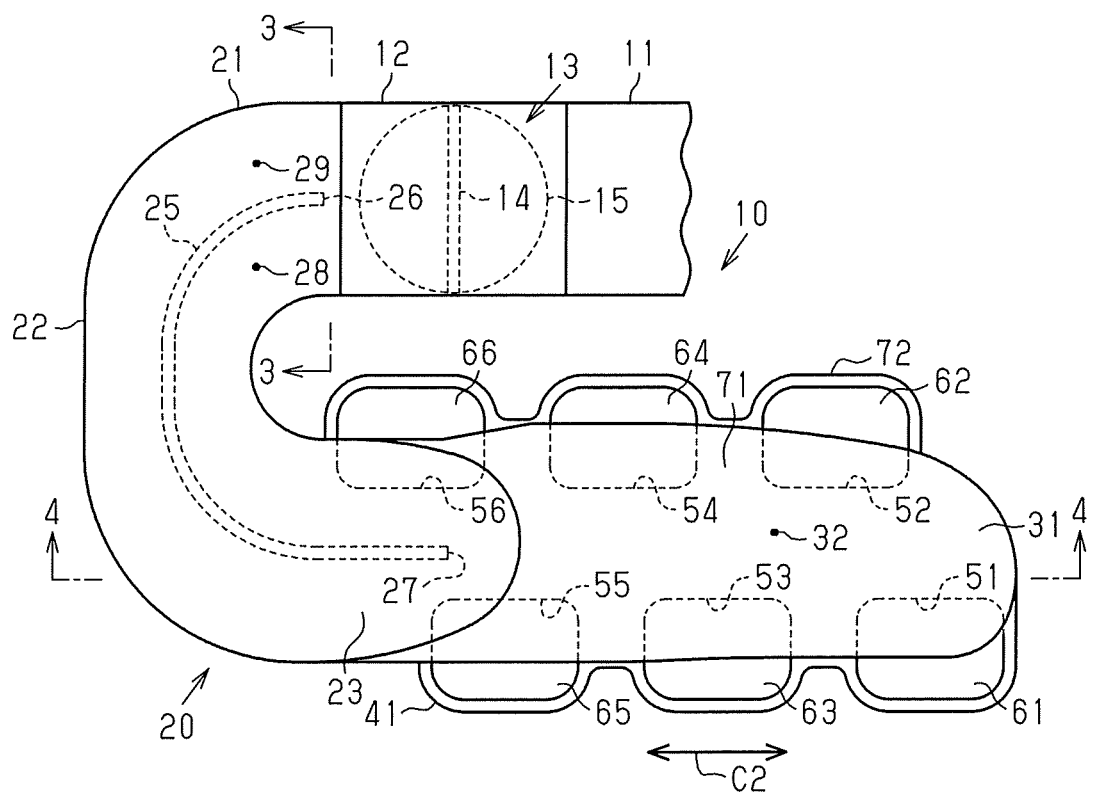
FIG. 2 is a plan view showing the intake device for the internal combustion engine in the first embodiment.

The internal combustion engine 90 includes an intake passage 11 in which a throttle body 12 incorporating a throttle valve 13 is arranged. As shown in FIG. 2, a surge tank 71 and an intake manifold 72 are sequentially arranged in the intake passage 11 at a downstream side of the throttle body 12.

As shown in FIGS. 1 and 2, the intake device 10 includes a manifold unit 41. The intake device 10 includes a surge tank unit 20 coupled to the manifold unit 41. As shown in FIG. 1, the surge tank unit 20 and the manifold unit 41 are located between the right bank 91A and the left bank 91B.

As shown in FIG. 2, the manifold unit 41 includes a first runner 61 to a sixth runner 66. The first runner 61 to the sixth runner 66 respectively distribute intake air to each of the cylinder having cylinder numbers "#1" to "#6." FIG. 1 shows the second runner 62, which is one of the runners connected to the right bank 91A, and the first runner 61, which is one of the runners connected to the left bank 91B. The manifold unit 41 including the first runner 61 to the sixth runner 66 configures the intake manifold 72.

The surge tank unit 20 includes a tank 31 including a cavity that is connected to the first runner 61 to the sixth runner 66. The cavity defines a convergence portion 32 between the surge tank unit 20 and the manifold unit 41. The convergence portion 32 is defined by the tank 31 of the surge tank unit 20 and the manifold unit 41 connected to the tank 31. The surge tank unit 20 includes a connection pipe 21 connected to the tank 31. The connection pipe 21 connects the tank 31 and the throttle body 12. In the surge tank unit 20, the tank 31 and the connection pipe 21 are integrally molded.

The throttle valve 13 incorporated in the throttle body 12 is a butterfly valve. As shown in FIG. 2, the throttle valve 13 includes a rotation shaft 14 and a circular valve member 15 that rotates about the rotation shaft 14. The rotation shaft 14 is coupled to a position extending through the center of the valve member 15 and extends in a radial direction of the valve member 15.

As shown in FIG. 2, the connection pipe 21 is a pipe that connects the throttle body 12 and the tank 31. The connection pipe 21 includes a straight portion 23 extending in an extension direction of the rotation axis of the crankshaft 96 on a portion connected to the tank 31. FIG. 2 shows an extension direction C2 indicating the extension direction of the rotation axis of the crankshaft 96. The straight portion 23 is connected to an end of the tank 31 in the extension direction C2. The connection pipe 21 includes a U-shaped curved portion 22 located at an upstream side of the straight portion 23. The curved portion 22 configures a curved flow passage extending between the throttle body 12 and the tank 31. When intake air that has passed through the throttle body 12 flows through the connection pipe 21, the connection pipe 21 including the curved portion 22 changes the direction of the flow of the intake air 180°, and the intake air is drawn into the convergence portion 32 included in the tank 31.

Figure 3:
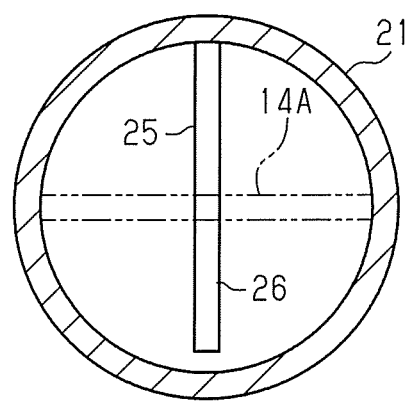
FIG. 3 is a cross-sectional view taken along line 3-3 in FIG. 2.

The connection pipe 21 includes a partition plate 25 that divides the curved flow passage, which extends between the throttle body 12 and the tank 31, into a circumferentially inner flow passage 28 and a circumferentially outer flow passage 29. As shown in FIG. 2, the partition plate 25 extends from the upstream side to the downstream side along the flow passage configured by the connection pipe 21. As shown in FIG. 3, the partition plate 25 includes a basal end connected the inner wall of the connection pipe 21. The partition plate 25 divides the flow passage by extending from the basal end in the radial direction through the center of the cross section of the flow passage in the connection pipe 21. The partition plate 25 includes a distal end opposite to the basal end. The distal end of the partition plate 25 is spaced apart from the inner wall by a gap that connects the flow passages that are divided by the partition plate 25.

FIG. 3 shows the end of the partition plate 25 that is opposed to the throttle body 12 defining an upstream end 26. FIG. 3 also shows a projection line 14A projecting the rotation shaft 14 of the throttle valve 13 onto the upstream end 26 along the flow passage of the intake passage 11. The projection line 14A intersects with the upstream end 26 on the center of the cross section of the flow passage in the connection pipe 21. Moreover, in the intake device 10, the throttle valve 13 and the partition plate 25 are arranged so that the projection line 14A is orthogonal to the upstream end 26.

As shown in FIG. 2, a terminal portion 27, which is the end of the partition plate 25 located adjacent to the tank 31, is located in the straight portion 23 of the connection pipe 21 and extends in the extension direction C2.

Figure 4:
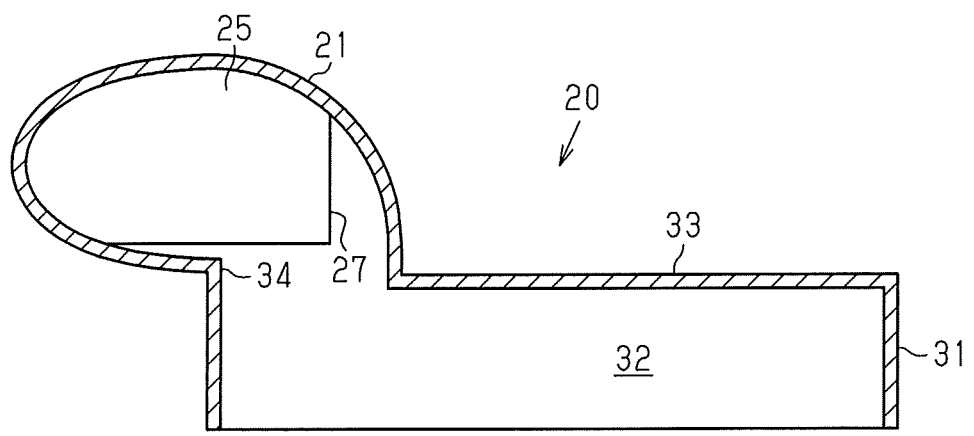
FIG. 4 is a cross-sectional view taken along line 4-4 of FIG. 2.

As shown in FIGS. 2 and 4, the tank 31 including the convergence portion 32 includes an inlet 34 that is open in an upper wall 33 configuring a wall of the convergence portion 32 at a side of the convergence portion 32 opposite to the manifold unit 41. The straight portion 23 of the connection pipe 21 is connected to the inlet 34.

Among the first runner 61 to the sixth runner 66 of the manifold unit 41, the sixth runner 66 connected to the cylinder having the cylinder number "#6," the fourth runner 64 connected to the cylinder having the cylinder number "#4", and the second runner 62 connected to the cylinder having the cylinder number "#2" configure right bank runners that distribute intake air to the cylinders of the right bank 91A. As shown in FIGS. 1 and 2, the right bank runners are connected to the convergence portion 32 on a position closer to the right bank 91A than the portion of the tank 31 connected to the connection pipe 21. In the right bank runners, the sixth runner 66, the fourth runner 64, and the second runner 62 are sequentially arranged in the arrangement direction of the right cylinder group of the right bank 91A from the portion of the tank 31 connected to the connection pipe 21. More specifically, the right bank runners are arranged in the extension direction C2. The runners in the right bank runners are spaced apart from each other in the extension direction C2.

Among the first runner 61 to the sixth runner 66 of the manifold unit 41, the fifth runner 65 connected to the cylinder having the cylinder number "#5", the third runner 63 connected to the cylinder having the cylinder number "#3", and the first runner 61 connected to the cylinder having the cylinder number "#1" configure left bank runners that distribute intake air to the cylinders of the left bank 91B. As shown in FIGS. 1 and 2, the left bank runners are connected to the convergence portion 32 on a position closer to the left bank 91B than the portion of the tank 31 connected to the connection pipe 21. In the left bank runners, the fifth runner 65, the third runner 63, and the first runner 61 are sequentially arranged in the arrangement direction of the left cylinder group of the left bank 91B from the portion of the tank 31 connected to the connection pipe 21. More specifically, the left bank runners are arranged in the extension direction C2. The runners in the left bank runners are spaced apart from each other in the extension direction C2.

The left bank runners and the right bank runners are arranged in a staggered layout in the order of the first runner 61, the second runner 62, the third runner 63, the fourth runner 64, the fifth runner 65, and the sixth runner 66 from one side of the extension direction C2, that is, the right side in FIG. 2.

FIG. 2 shows broken lines indicating a first connection portion 51 to a sixth connection portion 56, which are portions of the convergence portion 32 connected to the first runner 61 to the sixth runner 66. The first connection portion 51 to the sixth connection portion 56 are arranged on the manifold unit 41 including the convergence portion 32.

The portions connected to the right bank runners, namely, the sixth connection portion 56, the fourth connection portion 54, and the second connection portion 52 are arranged in the arrangement direction of the right cylinder group of the right bank 91A. More specifically, the sixth connection portion 56, the fourth connection portion 54, and the second connection portion 52 are arranged in the extension direction C2. The sixth connection portion 56, the fourth connection portion 54, and the second connection portion 52 are spaced apart from each other in the extension direction C2.

The portions connected to the left bank runners, namely, the fifth connection portion 55, the third connection portion 53, and the first connection portion 51 are arranged in the arrangement direction of the left cylinder group of the left bank 91B. More specifically, the fifth connection portion 55, the third connection portion 53, and the first connection portion 51 are arranged in the extension direction C2. The fifth connection portion 55, the third connection portion 53, and the first connection portion 51 are spaced apart from each other in the extension direction C2.

As shown in FIG. 2, the curved portion 22 of the connection pipe 21 is curved from the straight portion 23 toward a region in which the right bank runners are arranged, that is, toward the right bank 91A.

In the intake device 10 of the present embodiment, the surge tank unit 20 including the tank 31 and the manifold unit 41 configuring the intake manifold 72 are coupled to form the surge tank 71 and the intake manifold 72. The intake device 10 is configured by the throttle body 12 located in the intake passage 11, the connection pipe 21, the surge tank 71, and the intake manifold 72.

The operation and advantages of the present embodiment will now be described.

Figure 5:
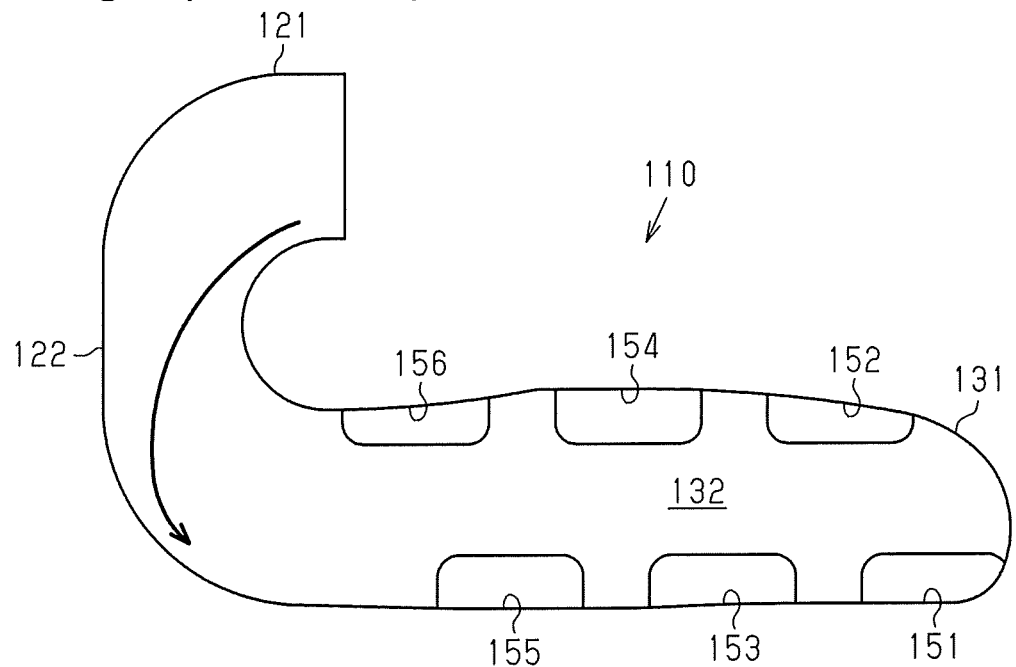
FIG. 5 is a schematic diagram showing flow of intake air flowing through a comparative example of an intake device for an internal combustion engine.

A comparative example of an intake device 110 will now be described with reference to FIG. 5. FIG. 5 shows an arrow schematically indicating the flow of intake air. Each component in the intake device 110 of the comparative example is given the reference numeral of the same component in the intake device 10 of the present embodiment that is incrementally increased by 100. The intake device 110 differs from the intake device 10 of the present embodiment in that the flow passage configured by a connection pipe 121 is not divided by a partition plate. Intake air flowing through the connection pipe 121 having such a configuration may be separated from the inner wall of the connection pipe 121 and concentrate on the outer circumferential side of a curved portion 122 when flowing through the curved portion 122. If such separation of the flow of intake air flowing through the connection pipe 121 disturbs the flow of the intake air when flowing into a tank 131, pressure loss in the surge tank may be increased. Consequently, differences in amount of intake air drawn into the cylinders through the respective runners may cause variations in pressure between the cylinders.

Additionally, in the portions of a convergence portion 132 connected to the right bank runners, that is, a sixth connection portion 156, a fourth connection portion 154, and a second connection portion 152, intake air may concentrate on the outer circumferential side of the curved portion 122 caused by separation of the flow of intake air flowing through the connection pipe 121. This hinders entrance of the intake air as compared to the portions of the convergence portion 132 connected to the left bank runners and, that is, the fifth connection portion 155, the third connection portion 153, and the first connection portion 151. In particular, entrance of intake air into the sixth connection portion 156, which is located closest to a connection portion of the connection pipe 121 and a tank 131, is hindered. This may also cause variations in pressure between the cylinders.

Figure 6:
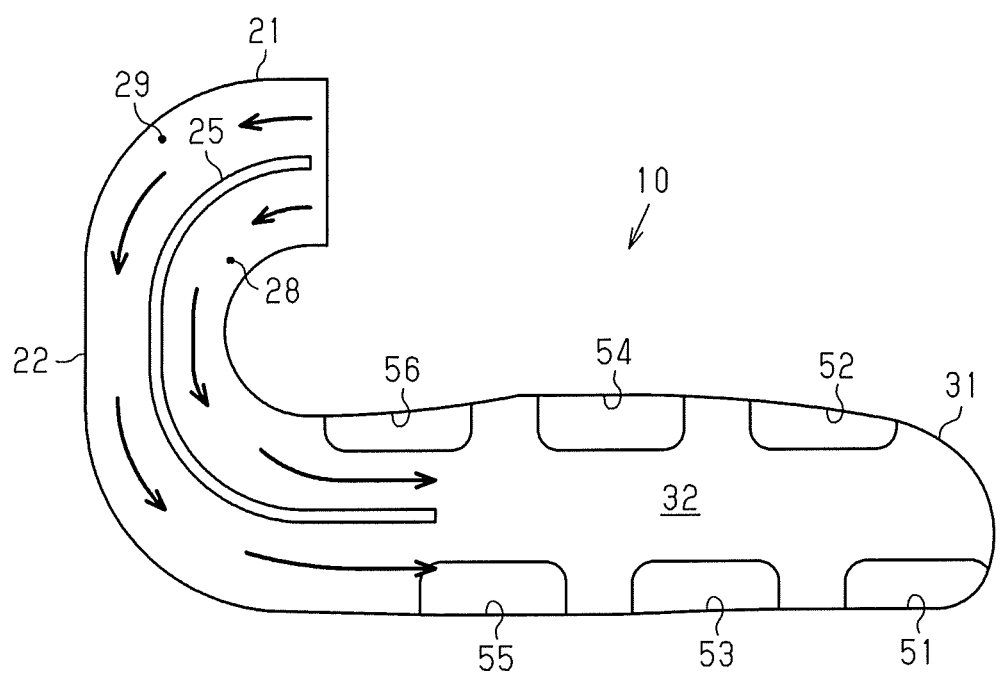
FIG. 6 is a schematic diagram showing flow of intake air flowing through the intake device for the internal combustion engine in the first embodiment.

The intake device 10 of the present embodiment will now be described with reference to FIG. 6. FIG. 6 shows an arrow schematically indicating the flow of intake air.

In the intake device 10, intake air that has passed through the throttle body 12 flows into the circumferentially outer flow passage 29 and the circumferentially inner flow passage 28, which are divided by the partition plate 25. Thus, intake air flowing through the flow passage configured by the connection pipe 21 is divided to the circumferentially outer flow passage 29 and the circumferentially inner flow passage 28 and drawn into the convergence portion 32 included in the tank 31. Even when intake air flowing through the circumferentially inner flow passage 28 is separated from the inner wall of the connection pipe 21 and flows toward the outer circumferential side of the curved portion 22, the intake air is guided by the partition plate 25 so that the intake air flows through the inner circumferential side of the curved portion 22 into the convergence portion 32. More specifically, the partition plate 25 guides intake air flowing through the connection pipe 21 and limits concentration of the intake air on the outer circumferential side of the curved portion 22. This limits disturbance of flow of the intake air flowing through the connection pipe 21 into the convergence portion 32 included in the tank 31. Thus, increases in pressure loss in the tank 31 are limited.

As described above, the intake device 10, which includes the partition plate 25, reduces concentration of flow of intake air on the circumferentially outer side of the flow passage configured by the curved portion 22. Thus, intake air readily flows into the right bank runners as compared to a case that does not include a partition plate such as the intake device 110 of the comparative example. This reduces variations in pressure between the cylinders and limits occurrence of noise caused by variations in pressure between the cylinders.

In addition, in the intake device 10, the terminal portion 27 of the partition plate 25 is arranged in the straight portion 23 of the connection pipe 21 connected to the tank 31. The terminal portion 27 of the partition plate 25 extends in the extension direction C2 of the rotation axis of the crankshaft 96 in the same manner as the straight portion 23 of the connection pipe 21. Thus, intake air drawn into the surge tank 71 is guided to flow in the extension direction C2. More specifically, while limiting disturbance of the flow of intake air flowing through the connection pipe 21 into the surge tank 71, the intake air is directed in the extension direction C2 and drawn into the surge tank 71. Thus, the intake air readily flows into the first runner 61, which is connected to the position farthest from the portion of the tank 31 connected to the connection pipe 21. This reduces variations in pressure between cylinders.

Since the throttle valve 13 of the intake device 10 is a butterfly valve, the circular valve member 15 rotates about the rotation shaft 14. One half of the valve member 15 located at one side of the rotation shaft 14 opens toward an upstream side, and the remaining half of the valve member 15 located at the other side of the rotation shaft 14 opens toward a downstream side. Thus, flow of intake air that has passed through a portion of the valve member 15 that is open toward the upstream side may differ from flow of intake air that has passed through a portion of the valve member 15 that is open toward the downstream side. In this regard, in the intake device 10, the projection line 14A of the rotation shaft 14 of the throttle valve 13 intersects with the upstream end 26 of the partition plate 25 in the center of the cross section of the flow passage in the connection pipe 21. The projection line 14A is orthogonal to the upstream end 26. Thus, the partition plate 25 equally divides the flow of intake air that has passed through the portion of the valve member 15 open toward the upstream side and the flow of intake air that has passed through the portion of the valve member 15 open toward the downstream side and allows the intake air to flow into the circumferentially inner flow passage 28 and the circumferentially outer flow passage 29, which are defined by the partition plate 25. Concentration of flow of intake air caused by the intake air flowing through the throttle body 12 is reduced when the intake air flows through the connection pipe 21. This limits disturbance of the intake air in the surge tank.

The correspondence between the items in the above embodiment and the items described in "SUMMARY" is as follows.

The right bank 91A corresponds to the first bank, and the left bank 91B corresponds to the second bank. The right bank runners correspond to the first bank runner, and the left bank runners correspond to the second bank runner.

The present embodiment may be modified as follows. The present embodiment and the following modifications can be combined as long as the combined modifications remain technically consistent with each other.

In the first embodiment, an example of the partition plate 25, which divides the flow passage configured by the connection pipe 21, extends through the center of the cross section of the flow passage in the connection pipe 21. However, the partition plate may extend through a position deviated from the center of the cross section of the flow passage in the connection pipe 21 as long as the flow passage configured by the connection pipe 21 is divided into a circumferentially inner flow passage and a circumferentially outer flow passage.

In the first embodiment, the end of the partition plate 25 is spaced apart from the inner wall of the connection pipe 21 by a gap so that the circumferentially inner flow passage 28 is connected to the circumferentially outer flow passage 29. However, the circumferentially inner flow passage 28 and the circumferentially outer flow passage 29 may be completely separated by a partition plate without a gap.

Second Embodiment

A second embodiment of an intake device 210 will now be described with reference to FIGS. 7 and 8.

In the intake device 10 of the first embodiment, the partition plate 25, which divides the flow passage configured by the connection pipe 21, extends through the center of the cross section of the flow passage in the connection pipe 21. The intake device 210 of the second embodiment differs from the first embodiment in that a partition plate extends through a position deviated from the center of the cross section of the flow passage in the connection pipe. The same reference characters are given to those elements that are the same as the corresponding elements of the first embodiment. Such elements will not be described in detail.

Figure 7:
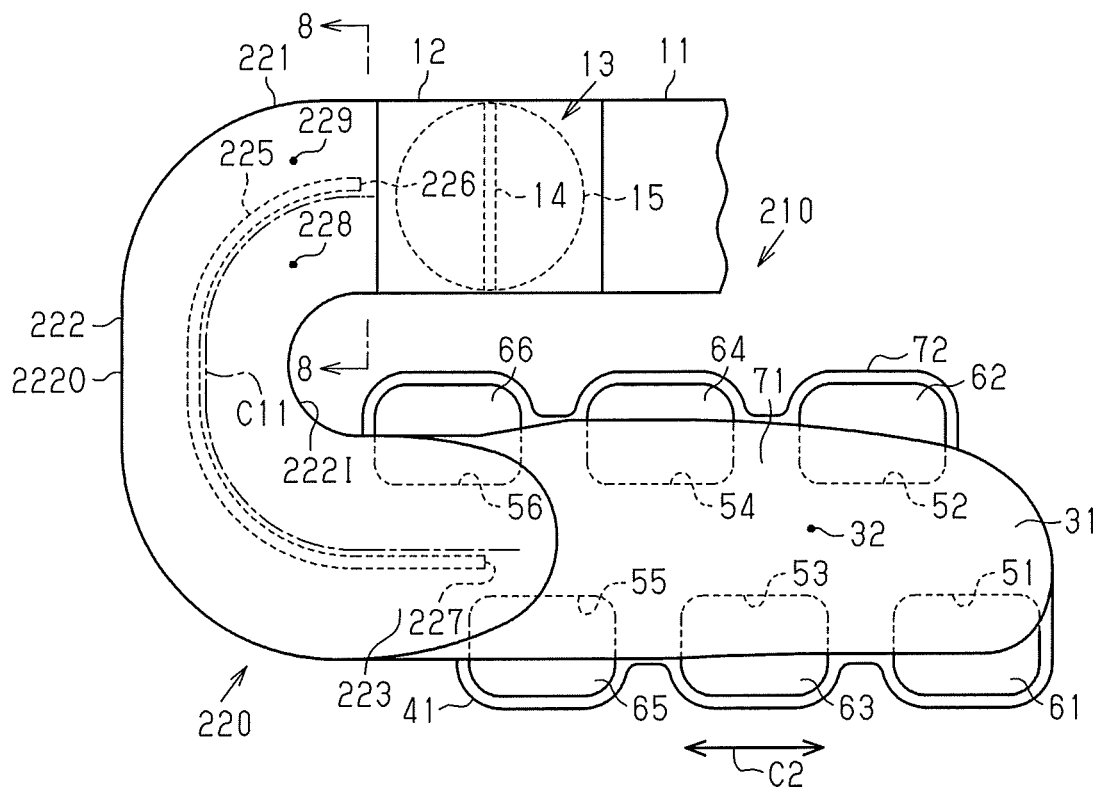
FIG. 7 is a plan view showing a second embodiment of an intake device for an internal combustion engine.

FIG. 7 shows the intake device 210. The intake device 210 includes a surge tank unit 220 including a connection pipe 221 that connects the throttle body 12 and the tank 31. The connection pipe 221 includes a U-shaped curved portion 222. The curved portion 222 configures a curved flow passage extending between the throttle body 12 and the tank 31.

FIG. 7 shows an axis C11 extending along the center axis of the connection pipe 221. In FIGS. 7 and 8, an inner portion 2221 indicates a portion of the U-shaped curved portion 222 located at an inner side of the axis C11, and an outer portion 2220 indicates a portion of the U-shaped curved portion 222 located at an outer side of the axis C11.

As shown in FIG. 7, the connection pipe 221 includes a partition plate 225 that divides the curved flow passage, which extends between the throttle body 12 and the tank 31, into a circumferentially inner flow passage 228 and a circumferentially outer flow passage 229. The partition plate 225 extends from the upstream side to the downstream side along the flow passage configured by the connection pipe 221. As shown in FIG. 7, the partition plate 225 is located in the outer portion 222O. A terminal portion 227, which is the end of the partition plate 225 located adjacent to the tank 31, is located in a straight portion 223 of the connection pipe 221 and extends in the extension direction C2.

Figure 8:
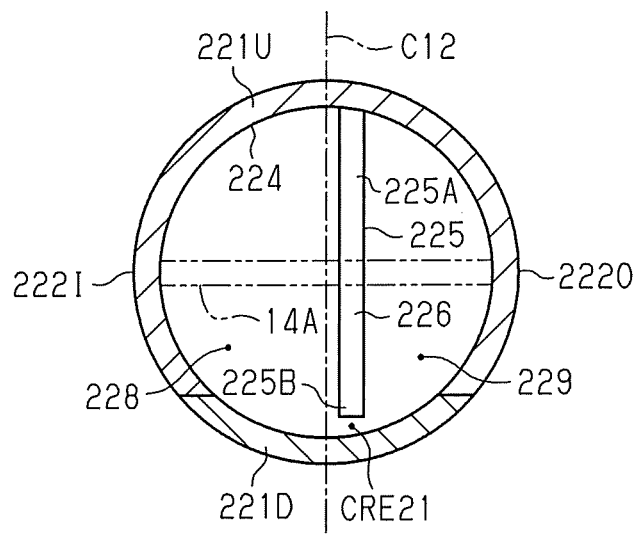
FIG. 8 is a cross-sectional view taken along line 8-8 in FIG. 7.

FIGS. 7 and 8 show the end of the partition plate 225 opposed to the throttle body 12 defining an upstream end 226. FIG. 8 shows a projection line 14A projecting the rotation shaft 14 of the throttle valve 13 onto the upstream end 226 along the flow passage of the intake passage 11. FIG. 8 also shows an axis C12 intersecting the projection line 14A and extending through the center of the cross section of the flow passage in the connection pipe 221.

As shown in FIG. 8, the partition plate 225 has an end connected to an inner wall 224 of the connection pipe 221 defining a basal end 225A. The partition plate 225 extends in the radial direction of the connection pipe 221 through a portion located closer to the outer portion 222O than the axis C12. The end of the partition plate 225 that is opposite to the basal end 225A defining a distal end 225B is spaced apart from the inner wall 224. Since the distal end 225B is spaced apart from the inner wall 224, a gap CRE21 extends between the distal end 225B and the inner wall 224 to connect the flow passages that are divided by the partition plate 225. Since the partition plate 225 is located closer to the outer portion 222O than the axis C12, the circumferentially inner flow passage 228 has a larger cross-sectional area than the circumferentially outer flow passage 229.

As shown in FIG. 8, the connection pipe 221 is configured by a first housing 221U connected to the basal end 225A of the partition plate 225 and a second housing 221D, which is coupled to the first housing 221U to be tubular.

The operation and advantages of the present embodiment will now be described.

To facilitate manufacturing, a connection pipe may be configured by coupling multiple housings such as the connection pipe 221 configured by the first housing 221U and the second housing 221D. When the connection pipe is configured by multiple housings, it may be difficult to connect both the basal end and the distal end of the partition plate to the inner wall of the connection pipe. In an intake device in which a gap extends between the distal end of the partition plate and the inner wall of the connection pipe such as the gap CRE21 shown in FIG. 8, intake air flowing through the circumferentially inner flow passage flows into the circumferentially outer flow passage through the gap. This may result in an uneven proportion of the intake air flowing through the circumferentially inner flow passage and the intake air flowing through the circumferentially outer flow passage. An uneven proportion of the intake air flowing through the circumferentially inner flow passage and the intake air flowing through the circumferentially outer flow passage may disturb the flow of intake air flowing through the connection pipe into the tank.

Intake air that has passed through the throttle valve 13 flows into the connection pipe 221 along the U-shaped curved portion. At this time, as the intake air flows toward the downstream side of the curved portion 222, the intake air readily flows to a portion located closer to the outer portion 222O than the axis C12. Intake air flowing through the circumferentially inner flow passage 228 readily flows into the circumferentially outer flow passage 229 through the gap CRE21. In this regard, in the intake device 210, the partition plate 225 is located closer to the outer portion 222O than the axis C12 so that the circumferentially inner flow passage 228 is wider than the circumferentially outer flow passage 229. More specifically, based on an assumption that intake air flows from the circumferentially inner flow passage 228 into the circumferentially outer flow passage 229 through the gap CRE21, the rate of intake air flowing through the circumferentially inner flow passage 228 and the rate of intake air flowing through the circumferentially outer flow passage 229 become close to each other. This regulates the intake air flowing through the connection pipe 221 into the tank 31.

Third Embodiment

A third embodiment of an intake device 310 will now be described with reference to FIGS. 9 and 10.

The intake device 310 differs from the intake device 10 of the first embodiment and the intake device 210 of the second embodiment in that the intake device 310 includes a first partition plate 331 and a second partition plate 337 as partition plates that divide the flow passage in a connection pipe 321. The same reference characters are given to those elements that are the same as the corresponding elements of the first embodiment. Such elements will not be described in detail.

Figure 9:
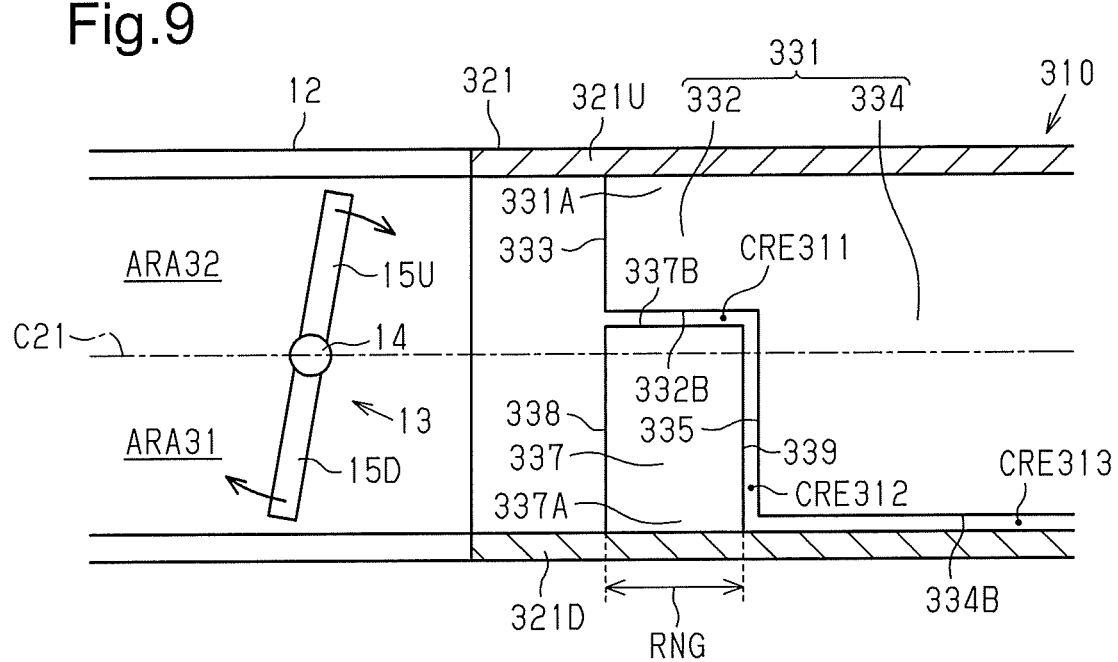
FIG. 9 is a cross-sectional view showing a connection pipe of a third embodiment of an intake device for an internal combustion engine.
Figure 10:
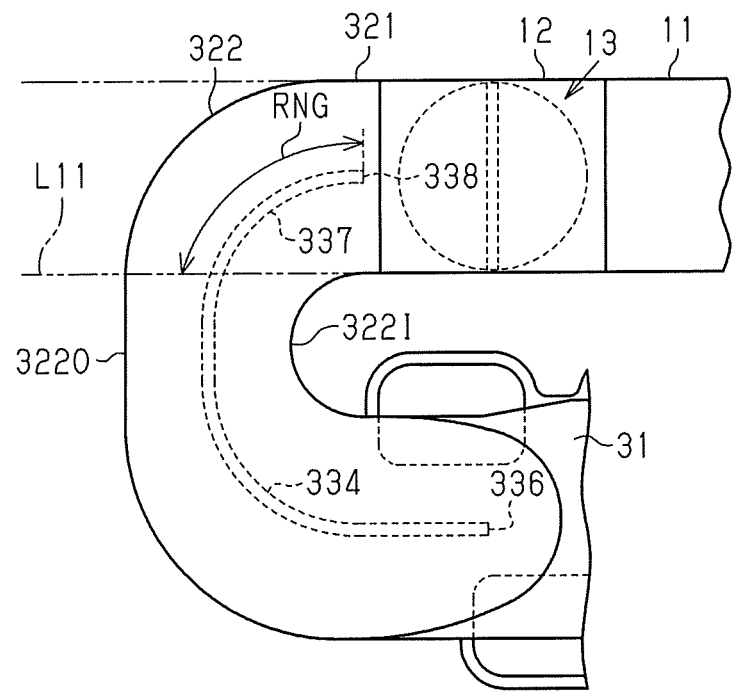
FIG. 10 is a plan view showing the intake device for the internal combustion engine in the third embodiment.

As shown in FIGS. 9 and 10, the intake device 310 includes the connection pipe 321 connecting the tank 31 and the throttle body 12. FIG. 9 shows a cross-sectional structure of connection portions of the throttle body 12 and the connection pipe 321.

The connection pipe 321 is configured by multiple housings in the same manner as the connection pipe 221 of the intake device 210 of the second embodiment. As shown in FIG. 9, the connection pipe 321 is configured by coupling a first housing 321U and a second housing 321D.

The first partition plate 331 and the second partition plate 337 are arranged in the connection pipe 321 as partition plates extending from the upstream side to the downstream side along a flow passage configured by the connection pipe 321 to divide the flow passage.

As shown in FIG. 9, in the intake device 310, the throttle valve 13 includes a valve member that rotates about the rotation shaft 14. When opening the throttle valve 13 from the fully-closed state, the portion of the valve member inclined toward the upstream side of the flow passage for intake air to open the flow passage is defined as a first valve member 15D. The first valve member 15D is located closer to the second housing 321D than the rotation shaft 14. When opening the throttle valve 13 from the fully-closed state, the portion of the valve member, which rotates about the rotation shaft 14, inclined toward the downstream side of the flow passage for intake air to open the flow passage is defined as a second valve member 15U. The second valve member 15U is located closer to the first housing 321U than the rotation shaft 14.

FIG. 9 shows a straight line C21 indicating an imaginary plane that intersects with the first partition plate 331 and the second partition plate 337 to divide the flow passage of the connection pipe 321 into two regions. The imaginary plane is an imaginary flat plane that divides the flow passage in the connection pipe 321 into a first pipe inner region ARA31, which is a region including the first valve member 15D, and a second pipe inner region ARA32, which is a region excluding the first pipe inner region ARA31. In the third embodiment, the straight line C21, which indicates the imaginary plane in FIG. 9, coincides with the center axis of the connection pipe 321.

As shown in FIG. 9, the first partition plate 331 is connected to the first housing 321U. The first partition plate 331 includes a basal end 331A connected to the first housing 321U and a long body 334 extending from the basal end 331A toward the second housing 321D beyond the straight line C21. More specifically, the long body 334 includes a distal end 334B opposite to the basal end 331A, and the distal end 334B is located in the first pipe inner region ARA31. The distal end 334B of the long body 334 is not connected to the second housing 321D. Thus, the distal end 334B of the long body 334 is spaced apart from the second housing 321D by a third gap CRE313. As shown in FIG. 10, a terminal end 336, which is the end of the long body 334 located adjacent to the tank 31, is located in the straight portion of the connection pipe 321.

The first partition plate 331 includes a short body 332 connected to a portion of the long body 334 opposed to the throttle body 12. The short body 332 extends from the basal end 331A, which is connected to the first housing 321U, toward the second housing 321D. The short body 332 includes a distal end 332B opposite to the basal end 331A. The distal end 332B is located in the second pipe inner region ARA32.

As shown in FIG. 9, the second partition plate 337 is located between the long body 334 and the throttle body 12. The second partition plate 337 is connected to the second housing 321D. The second partition plate 337 includes a basal end 337A connected to the second housing 321D and extends from the basal end 337A toward the first housing 321U beyond the straight line C21. The second partition plate 337 includes a distal end 337B opposite to the basal end 337A. The distal end 337B is located in the second pipe inner region ARA32.

The downstream end of the second partition plate 337, defining a terminal end 339, is opposed to an upstream end 335 of the long body 334. A second gap CRE312 extends between the terminal end 339 of the second partition plate 337 and the upstream end 335 of the long body 334. The distal end 337B of the second partition plate 337 is opposed to the distal end 332B of the short body 332. A first gap CRE311 extends between the distal end 337B of the second partition plate 337 and the distal end 332B of the short body 332. More specifically, the sum of the dimension of the second partition plate 337 in the radial direction of the connection pipe 321 and the dimension of the short body 332 in the radial direction of the connection pipe 321 is less than the inner diameter of the connection pipe 321 in a direction connecting the basal end 337A and the distal end 337B of the second partition plate 337. Additionally, the short body 332 includes an upstream end 333 opposed to the throttle body 12, and the second partition plate 337 includes an upstream end 338 opposed to the throttle body 12. The upstream end 333 and the upstream end 338 are located at the same position in the extension direction of the straight line C21.

In other words, in the cross-sectional structure shown in FIG. 9, the first partition plate 331 is shaped so that the short body 332 is cut away in a portion located closer to the second housing 321D than the distal end 332B and the long body 334 is cut away in a portion located closer to the throttle body 12 than the upstream end 335. The second partition plate 337 is arranged in the cutaway space of the first partition plate 331.

The dimension of the second partition plate 337 in the extension direction of the straight line C21 will now be described with reference to FIGS. 9 and 10. The double-dashed lines in FIG. 10 indicate imaginary lines obtained when the intake passage 11 located at an upstream side of the throttle body 12 is assumed to extend to a downstream side of the throttle body 12 without changing the direction in which the intake passage 11 extends. The imaginary line connected to an inner portion 322I of a curved portion 322 is defined as an imaginary line L11.

As shown in FIGS. 9 and 10, the second partition plate 337 is located in an upstream range RNG, which is a range of a specified dimension, in the flow direction of intake air. The base point of the upstream range RNG opposed to the throttle body 12 is the upstream end 338 of the second partition plate 337. The second partition plate 337 is arranged in the upstream range RNG from the upstream end 338 of the second partition plate 337, serving as the base point. As shown in FIG. 9, the dimension of the second partition plate 337 between the upstream end 338 and the terminal end 339 is equal to the dimension of the upstream range RNG. As shown in FIG. 10, the curved portion 322 includes the inner portion 322I and an outer portion 322O and has a U-shaped curvature. Thus, the second partition plate 337 located in the curved portion 322 intersects with the imaginary line L11 at a downstream side of the throttle body 12. The end point of the upstream range RNG coincides with the intersection of the second partition plate 337 and the imaginary line L11. The upstream range RNG may refer to a range in which when intake air that has passed through the throttle body 12 flows into the curved portion 322, the direction of the intake air flowing straight starts to bend. In other words, in the upstream range RNG, the intake air traveling straight may strike the first partition plate 331 and the second partition plate 337.

As shown in FIG. 9, the first gap CRE311 is located in the upstream range RNG of the second pipe inner region ARA32. More specifically, in the upstream range RNG of the second pipe inner region ARA32, the first gap CRE311 connects the circumferentially outer flow passage and the circumferentially outer flow passage in the connection pipe 321, which are located opposite sides of the first and second partition plates 331 and 337. The third gap CRE313 is located at a downstream side of the upstream range RNG in the first pipe inner region ARA31.

The first gap CRE311 and the third gap CRE313 extend in the extension direction of the straight line C21. The second gap CRE312 extends in the radial direction of the connection pipe 321. In the radial direction of the connection pipe 321, the second gap CRE312 has one end connected to the first gap CRE311 and the other end connected to the third gap CRE313.

In the intake device 310, in the upstream range RNG of the first pipe inner region ARA31, the second partition plate 337 divides the flow passage in the connection pipe 321 into the circumferentially inner flow passage and the circumferentially outer flow passage.

The operation and advantages of the present embodiment will now be described.

When a butterfly valve opens, intake air that has passed through a portion of the valve member that is open toward the upstream side may flow faster than intake air that has passed through a portion of the valve member that is open toward the downstream side. In the intake device 310, when the throttle valve 13 opens from the fully-closed state, at the downstream side of the throttle valve 13, intake air may flow faster in the first pipe inner region ARA31 corresponding to the first valve member 15D than in the second pipe inner region ARA32. In the same manner, immediately before closing the throttle valve 13, at the downstream side of the throttle valve 13, intake air may flow faster in the first pipe inner region ARA31 corresponding to the first valve member 15D than in the second pipe inner region ARA32.

In the intake device 310, the first partition plate 331 and the second partition plate 337 are arranged so that the first gap CRE311, which is the gap closest to the throttle body 12 and connects the circumferentially inner flow passage and the circumferentially outer flow passage located opposite sides of the partition plates, is arranged in the second pipe inner region ARA32, in which the flow of intake air is relatively slow when opening the throttle valve 13. Thus, the flow of intake air flowing through the throttle valve 13 and arriving at the first gap CRE311 is relatively slow. This limits mixing of intake airs flowing through the circumferentially inner flow passage and the circumferentially outer flow passage, which are located opposite sides of the first and second partition plates 331 and 337, even though the first gap CRE311 is present. More specifically, in the intake device 310, the dimension of the partition plates is less than the inner diameter of the connection pipe 321, and the gap connects the circumferentially inner flow passage and the circumferentially outer flow passage. However, the advantage of the first and second partition plates 331 and 337 limiting disturbance of intake air will not be reduced.

In the upstream range RNG, the intake air traveling straight may strike the first partition plate 331 and the second partition plate 337. Thus, when a partition plate includes a gap in the upstream range RNG, intake air flowing through the circumferentially inner flow passage readily flows into the circumferentially outer flow passage through the gap. In this regard, in the intake device 310, the first and second partition plates 331 and 337 are arranged so that the upstream range RNG does not include a gap in the first pipe inner region ARA31, in which the flow of intake air is relatively fast when opening the throttle valve 13. Thus, in the upstream range RNG, the intake air flowing at high speeds is guided and divided into the circumferentially inner flow passage and the circumferentially outer flow passage by the second partition plate 337. This regulates the flow of intake air flowing through the connection pipe 321.

In the intake device 310, in the first pipe inner region ARA31, the second partition plate 337 guides intake air in the upstream range RNG. Thus, in the first pipe inner region ARA31, at the downstream side of the upstream range RNG, intake air may be divided and flow into the circumferentially inner flow passage and the circumferentially outer flow passage. In this regard, in the intake device 310, the first and second partition plates 331 and 337 are arranged so that the third gap CRE313 is located at the downstream side of the upstream range RNG in the first pipe inner region ARA31. This limits entrance of intake air flowing through the circumferentially inner flow passage into the circumferentially outer flow passage even though the gap is present at the downstream of the upstream range RNG.

The present embodiment may be modified as follows. The present embodiment and the following modifications can be combined as long as the combined modifications remain technically consistent with each other.

In the same manner as the intake device 210 of the second embodiment, the third embodiment may be configured so that a partition plate extends through a position deviated from the center of the cross section of the flow passage in the connection pipe.

In the third embodiment, the dimension of the second partition plate 337 is equal to the dimension of the upstream range RNG. Instead, the dimension of the second partition plate 337 may be less or greater than the dimension of the upstream range RNG. That is, the range of a specified dimension is not limited to the upstream range RNG.

In the third embodiment, the dimension of the second partition plate 337 is equal to the dimension of the upstream range RNG, which is the range of a specified dimension. The dimension of the second partition plate 337 may be greater than the dimension of the upstream range RNG as long as the flow passage in the connection pipe 321 is divided into the circumferentially inner flow passage and the circumferentially outer flow passage by the second partition plate 337 in the upstream range RNG of the first pipe inner region ARA31.

In the third embodiment, the throttle valve 13 is a butterfly valve such that when opening from the fully-closed state, the second valve member 15U located in a region corresponding to the first housing 321U is inclined toward the downstream side, and the first valve member 15D located in a region corresponding to the second housing 321D is inclined toward the upstream side. The butterfly valve that may be used in the intake device is not limited to the throttle valve 13.

Figure 11:
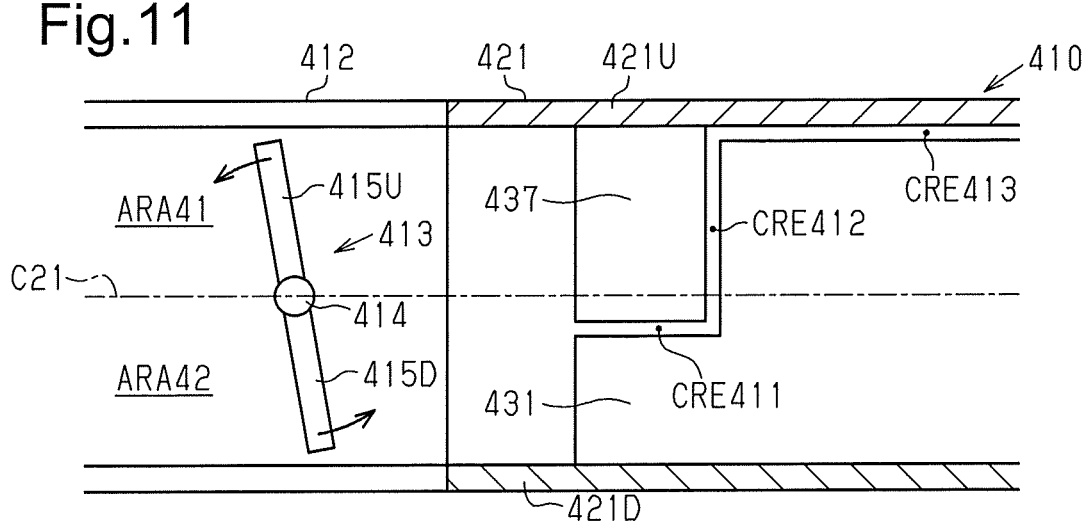
FIG. 11 is a cross-sectional view showing a connection pipe of an intake device for an internal combustion engine in a modified example.

For example, FIG. 11 shows an intake device 410 that includes a throttle body 412 incorporating a throttle valve 413. In the same manner as the connection pipe 321 of the third embodiment, the intake device 410 includes a connection pipe 421 configured by a first housing 421U and a second housing 421D. In the same manner as the connection pipe 321 of the third embodiment, the intake device 410 includes a first partition plate 431 and a second partition plate 437. The first partition plate 431 and the second partition plate 437 divide the flow passage in the connection pipe 421 into a circumferentially inner flow passage and a circumferentially outer flow passage and include gaps connecting the circumferentially inner flow passage and the circumferentially outer flow passage.

The throttle valve 413 includes a valve member that rotates about a rotation shaft 414. When opening the throttle valve 413 from the fully-closed state, the portion of the valve member inclined toward the upstream side of the flow passage for intake air to open the flow passage is defined as a first valve member 415U. The first valve member 415U is located in a region corresponding to the first housing 421U. When opening the throttle valve 413 from the fully-closed state, the portion of the valve member, which rotates about the rotation shaft 414, inclined toward the downstream side of the flow passage for intake air to open the flow passage is defined as a second valve member 415D. The second valve member 415D is located in a region corresponding to the second housing 421D.

When using the throttle valve 413 having such a configuration, the first partition plate 431 and the second partition plate 437 may be arranged so that the gap closest to the throttle body 412, namely, a first gap CRE411, is located in a second pipe inner region ARA42. More specifically, in the intake device 310 of the third embodiment, the first partition plate 331 having the long body 334 and the short body 332 is connected to the first housing 321U, whereas the first partition plate 431 having a long body and a short body projects from the second housing 421D as shown in FIG. 11. In addition, the second partition plate 437 projecting from the first housing 421U is located at a position opposed to the short body of the first partition plate 431. The straight line C21 shown in FIG. 11 indicates an imaginary plane that divides the flow passage in the connection pipe 421 into a first pipe inner region ARA41, which is a region including the first valve member 415U, and the second pipe inner region ARA42, which is a region excluding the first pipe inner region ARA41. The straight line C21 coincides with the center axis of the connection pipe 421. The second partition plate 437 is located in the upstream range in the same manner as the second partition plate 337 of the third embodiment.

The first gap CRE411 is located in the upstream range of the second pipe inner region ARA42. More specifically, in the upstream range of the second pipe inner region ARA42, the first gap CRE411 connects the first and second partition plates 431 and 437 of the connection pipe 421, which are located at opposite sides of the first and second partition plates 431 and 437. A third gap CRE413 is located at a downstream side of the upstream range in the first pipe inner region ARA41. A second gap CRE412 connects the first gap CRE411 and the third gap CRE413.

In the intake device 410, in the upstream range of the first pipe inner region ARA41, the second partition plate 437 divides the flow passage in the connection pipe 421 into the circumferentially inner flow passage and the circumferentially outer flow passage.

More specifically, in the same manner as the third embodiment, in the intake device 410, the first and second partition plates 431 and 437 are arranged so that the first gap CRE411, which is the gap closest to the throttle body 412 and connects the circumferentially inner flow passage and the circumferentially outer flow passage located opposite sides of the partition plates, is arranged in the second pipe inner region ARA42, in which the flow of intake air is relatively slow when opening the throttle valve 413. Thus, the intake device 410 obtains the same advantages as those of the third embodiment.

In the third embodiment, the upstream end 333 of the short body 332 and the upstream end 338 of the second partition plate 337 are located at the same position in the axial direction of the straight line C21. One of the upstream end 333 of the short body 332 and the upstream end 338 of the second partition plate 337 may be located closer to the throttle body 12 than the other.

In the third embodiment, the first partition plate 331 includes the long body 334 and the short body 332. However, the short body does not necessarily have to be included. For example, when using the throttle valve 13, the configuration shown in FIG. 12 may be used. When using the throttle valve 413, the configuration shown in FIG. 13 may be used.

Figure 12:
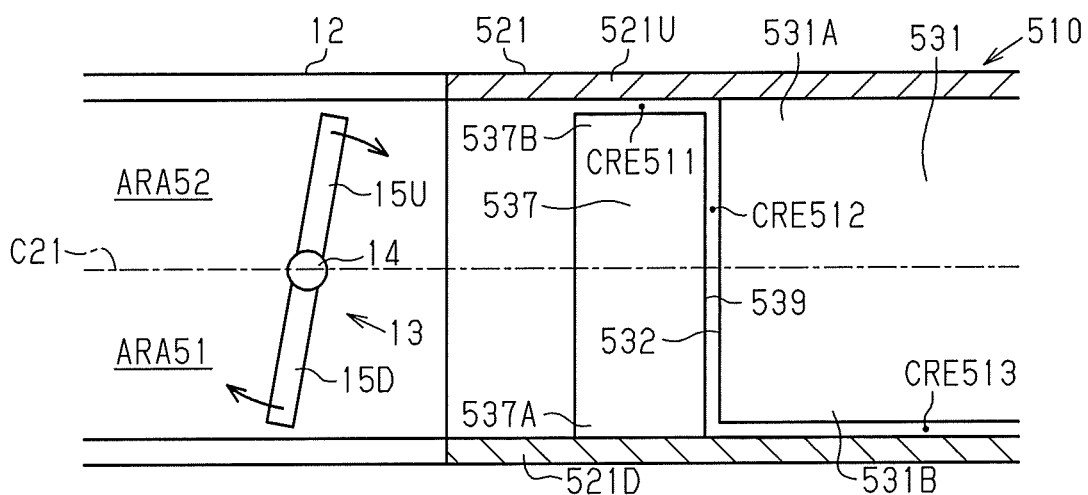
FIG. 12 is a cross-sectional view showing a connection pipe of an intake device for an internal combustion engine in another modified example.

FIG. 12 shows an intake device 510. In FIG. 12, a first pipe inner region ARA51 refers to a region divided by the imaginary plane indicated by the straight line C21 and including the first valve member 15D, and a second pipe inner region ARA52 refers to a region including the second valve member 15U. The intake device 510 differs from the intake device 310 of the third embodiment in the configuration of a first partition plate 531 and a second partition plate 537. More specifically, the second partition plate 537 includes a basal end 537A located on a second housing 521D of a connection pipe 521 and extends from the basal end 537A toward a first housing 521U. The dimension of the second partition plate 537 from the basal end 537A to a distal end 537B is greater than the dimension of the second partition plate 537. A first gap CRE511 extends between the distal end 537B of the second partition plate 537 and the first housing 521U. The intake device 510 includes the first partition plate 531 including a basal end 531A located on the first housing 521U of the connection pipe 521. In the intake device 510, a second gap CRE512 extends between a terminal end 539 of the second partition plate 537 and an upstream end 532 of the first partition plate 531. In the intake device 510, a third gap CRE513 extends between a distal end 531B of the first partition plate 531 and the second housing 521D.

More specifically, in the intake device 510, the first and second partition plates 531 and 537 are arranged so that the first gap CRE511, which is the closet gap to the throttle body 12 and connects the circumferentially inner flow passage and the circumferentially outer flow passage located opposite sides of the partition plates, is arranged in the second pipe inner region ARA52, in which the flow of intake air is relatively slow when opening the throttle valve 13.

Figure 13:
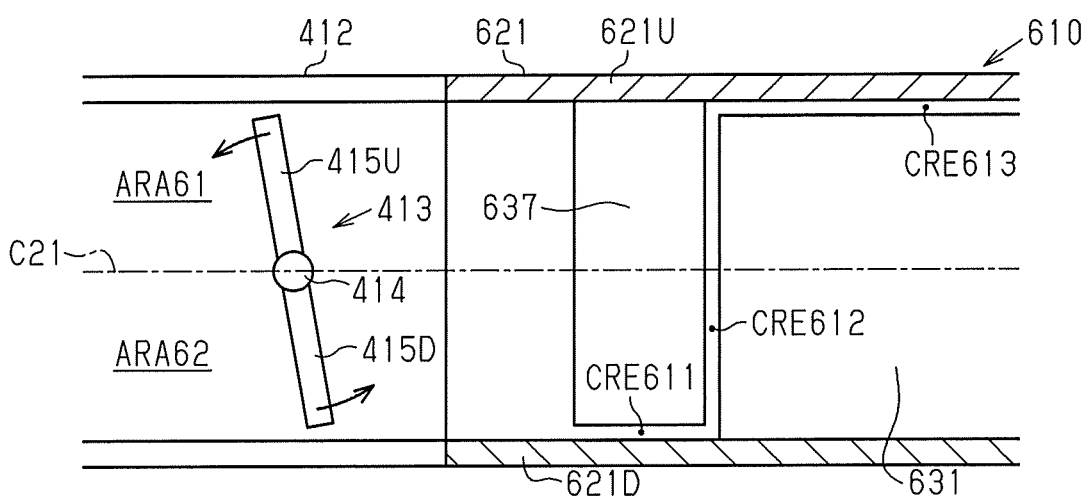
FIG. 13 is a cross-sectional view showing a connection pipe of an intake device for an internal combustion engine in another modified example.

FIG. 13 shows an intake device 610. In FIG. 13, a first pipe inner region ARA61 refers to a region divided by the imaginary plane indicated by the straight line C21 and corresponding to the first valve member 415U, and a second pipe inner region ARA62 refers to a region corresponding to the second valve member 415D. In the intake device 610, a second partition plate 637 is connected to a first housing 621U of a connection pipe 621. A first partition plate 631 is connected to a second housing 621D. In the intake device 610, a first gap CRE611 extends between the second partition plate 637 and the first housing 621U. A second gap CRE612 extends between the second partition plate 637 and the first partition plate 631. A third gap CRE613 extends between the first partition plate 631 and the second housing 621D.

More specifically, in the intake device 610, the first and second partition plates 631 and 637 are arranged so that the first gap CRE611, which is the gap closest to the throttle body 412 and connects the circumferentially inner flow passage and the circumferentially outer flow passage located opposite sides of the partition plates, is arranged in the second pipe inner region ARA62, in which the flow of intake air is relatively slow when opening the throttle valve 413.

The intake device 510 and the intake device 610 also obtain the same advantages as the intake device 310 of the third embodiment.

The third embodiment includes the first partition plate 331 and the second partition plate 337. The number of partition plates does not necessarily have to be two.

Figure 14:
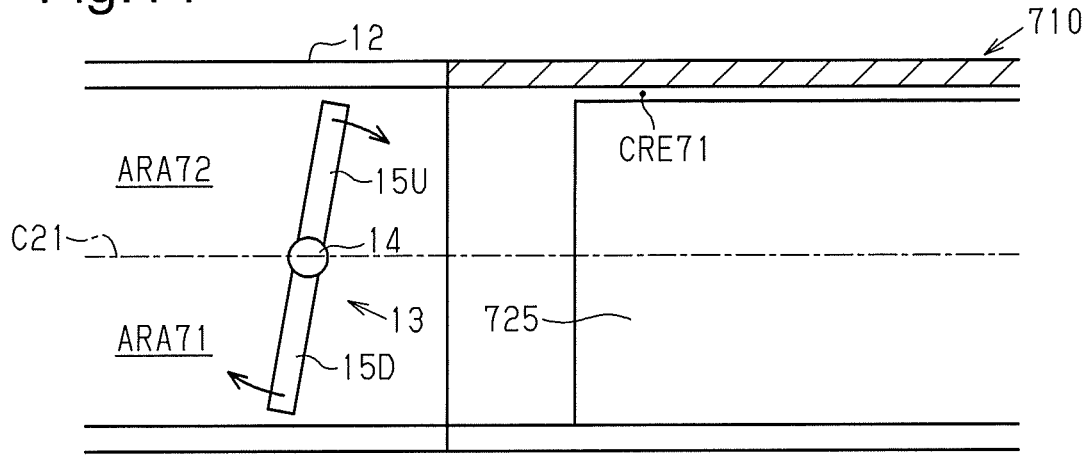
FIG. 14 is a cross-sectional view showing a connection pipe of an intake device for an internal combustion engine in another modified example.

For example, FIG. 14 shows an intake device 710 that includes a single partition plate 725. Even in such a case, when the partition plate 725 is arranged so that a gap CRE71 is located in a second pipe inner region ARA72, in which the flow of intake air is slower than in a first pipe inner region ARA71 when opening the throttle valve 13, the advantage of regulating the flow of intake air in the upstream range is obtained in the same manner as the third embodiment. In this case, the partition plate 725 includes a terminal end located in the straight portion of the connection pipe. In the intake device 710, in the upstream range of the first pipe inner region ARA71, the partition plate 725 divides the flow passage in the connection pipe into a circumferentially inner flow passage and a circumferentially outer flow passage.

The intake device 710 includes the throttle valve 13. However, an intake device including a single partition plate may include the throttle valve 413. Even in this case, when the partition plate is arranged so that a gap is located in a region in which the flow of intake air is relatively slow when opening the partition plate the throttle valve 413, the same advantage as the intake device 710 is obtained.

The third embodiment includes the first partition plate 331 and the second partition plate 337. The intake device may include three or more partition plates. For example, a first partition plate may be further cut away, and a third partition plate may be arranged in the cutaway space.

In the third embodiment, the first and second partition plates 331 and 337 are arranged so that the first gap CRE311 is located in the first pipe inner region ARA31. The location of the first gap CRE311 is not limited to the first pipe inner region ARA31. As long as the flow passage in the connection pipe 321 is divided into the circumferentially inner flow passage and the circumferentially outer flow passage by the second partition plate 337 in the upstream range RNG of the first pipe inner region ARA31, the first and second partition plates 331 and 337 may be arranged so that the first gap CRE311 is located on the straight line C21.

In the third embodiment, a butterfly valve is used as the throttle valve. A slide valve may be used as the throttle valve.

Figure 15:
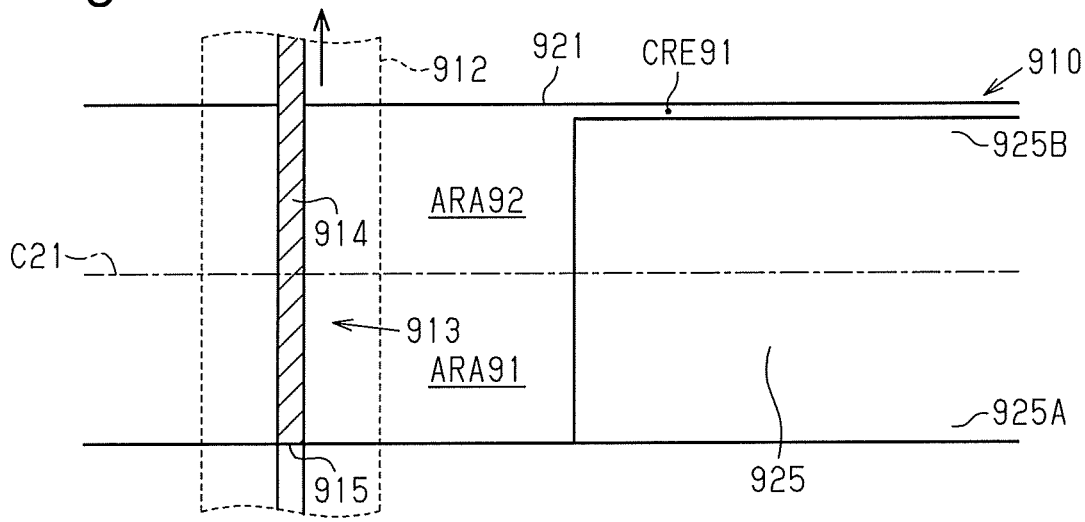
FIG. 15 is a cross-sectional view showing a connection pipe of an intake device for an internal combustion engine in another modified example.
Figure 16:
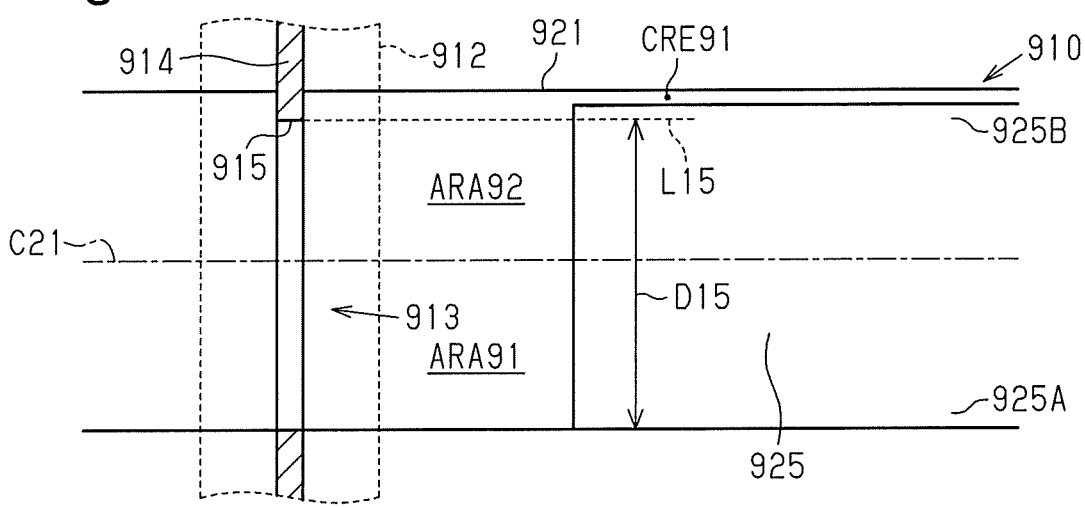
FIG. 16 is a cross-sectional view of the connection pipe shown in FIG. 15 when the slide valve is fully open.

FIGS. 15 and 16 show an intake device 910. FIGS. 15 and 16 show a slide valve 913 accommodated in a throttle body 912 as an example of a slide valve used in the intake device 910. The intake device 910 includes a connection pipe 921 including a partition plate 925. The terminal end of the partition plate 925 is located in a straight portion of a connection pipe.

FIGS. 15 and 16 show the straight line C21 indicating the center axis of the connection pipe 921. The slide valve 913 includes a valve member 914 having the form of a plate capable of closing the flow passage for intake air. The valve member 914 is movable in a direction orthogonal to the straight line C21. FIG. 15 shows an arrow indicating the direction in which the valve member 914 moves when opening the slide valve 913. The valve member 914 includes a valve hole 915. When the valve member 914 of the slide valve 913 is moved and the valve hole 915 is moved into the flow passages, the flow passages are connected by the valve hole 915.

The flow passage in the connection pipe 921 is divided into two regions by an imaginary plane intersecting the partition plate 925. In the connection pipe 921, the region in which the valve hole 915 is first moved into the flow passage when opening the slide valve 913 is defined as a first pipe inner region ARA91. The first pipe inner region ARA91 is a region with respect to the straight line C21 in which when opening the slide valve 913 from the fully-closed state, the flow passage located upstream of the slide valve 913 starts to be connected to the flow passage located downstream of the slide valve 913. The remaining region of the connection pipe 921 located at the opposite side of the straight line C21 with respect to the first pipe inner region ARA91 is defined as a second pipe inner region ARA92. When the slide valve 913 starts to open, intake air does not readily flow through the second pipe inner region ARA92. In addition, immediately before closing the slide valve 913, intake air does not readily flow through the second pipe inner region ARA92. In FIGS. 15 and 16, the straight line indicating an imaginary plane that divides the first pipe inner region ARA91 and the second pipe inner region ARA92 coincides with the straight line C21.

The partition plate 925 includes a basal end 925A connected to the inner wall of the connection pipe 921 in the first pipe inner region ARA91. The partition plate 925 includes a distal end 925B located in the second pipe inner region ARA92. Thus, in the intake device 910, in the upstream range of the first pipe inner region ARA91, the partition plate 925 divides the flow passage in the connection pipe into a circumferentially inner flow passage and a circumferentially outer flow passage. A gap CRE91 extends between the distal end 925B of the partition plate 925 and the inner wall of the connection pipe 921. More specifically, in the intake device 910, the gap CRE91, which connects the circumferentially inner flow passage and the circumferentially outer flow passage located at opposite sides of the partition plate 925, is located in the second pipe inner region ARA92, through which intake air does not readily flow when the slide valve 913 starts to open. Thus, the advantage of the partition plate limiting disturbance of intake air will not be reduced even though the gap CRE91 is present.

FIG. 16 shows a state in which the slide valve 913 is fully open. As shown in FIG. 16, even when the slide valve 913 is fully open, the diameter D15 of the valve hole 915 is less than the inner diameter of the flow passage. More specifically, even when the slide valve 913 is fully open, the valve member 914 partially projects in the flow passage in the connection pipe 921. Thus, the slide valve 913 includes a region in which the flow passages in the connection pipe 921 are blocked by the valve member 914 and a region in which the flow passages of the connection pipe 921 are not blocked by the valve member 914 when the slide valve 913 is fully open. The region in which the flow passages in the connection pipe 921 are not blocked by the valve member 914 refers to a region in which the valve hole 915, which is open in the valve member 914, connects the flow passages in the connection pipe 921. In FIG. 16, the boundary between the above regions in the connection pipe 921 is used as a boundary plane, and the boundary plane is projected onto the end of the partition plate 925 opposed to the slide valve 913 along the flow passage for intake air. FIG. 16 shows an imaginary line L15 extending along the projection line projecting the boundary plane in the axial direction of the straight line C21. The imaginary line L15 is located between the gap CRE91 and the straight line C21. The dimension of the partition plate 925 from the basal end 925A to the distal end 925B is greater than the distance from the basal end 925A to the imaginary line L15 in the direction connecting the basal end 925A and the distal end 925B. The distance from the basal end 925A to the imaginary line L15 is equal to the diameter D15 of the valve hole 915 shown in FIG. 16. More specifically, the imaginary line L15 intersects with the partition plate 925. In other words, in the region in which the flow passages in the connection pipe 921 are connected by the valve hole 915, the partition plate 925 divides the flow passage in the connection pipe 921 into the circumferentially inner flow passage and the circumferentially outer flow passage. Thus, in the intake device 910, although the gap CRE91 extends between the partition plate 925 and the inner wall of the connection pipe 921, intake air that has passed through the slide valve 913 is divided into the circumferentially inner flow passage and the circumferentially outer flow passage by the partition plate 925.

In the configuration shown in FIGS. 15 and 16, the slide valve 913 is used in the intake device 910 including the single partition plate 925. The slide valve 913 may be used in an intake device that includes two partition plates as in the intake device 310 of the third embodiment. Moreover, the slide valve may be used in an intake device that includes three or more partition plates. Even in this case, in the upstream range of the first pipe inner region, the partition plate 925 may divide the flow passage in the connection pipe into the circumferentially inner flow passage and the circumferentially outer flow passage. In addition, a partition plate may be arranged so that the imaginary line L15 is located between the straight line C21 and the gap closest to the throttle body. Accordingly, the same advantage as the configuration shown in FIGS. 15 and 16 is obtained.

The followings are modifications commonly applicable to the above embodiments.

In the first embodiment, the throttle valve 13 and the partition plate 25 are arranged so that the projection line 14A of the rotation shaft 14 of the throttle valve 13 is orthogonal to the upstream end 26 of the partition plate 25. The arrangement of the throttle valve and the partition plate in each embodiment is not limited to the above arrangement. When the projection line 14A of the rotation shaft 14 intersects with the upstream end 26, both intake air that has passed through a portion of the valve member 15 that is open toward the upstream side and intake air that has passed through a portion of the valve member 15 that is open toward the downstream side readily flow into the circumferentially inner flow passage 28 and the circumferentially outer flow passage 29 divided by the partition plate 25 as compared to when the projection line 14A of the rotation shaft 14 coincides with the upstream end 26 or is parallel to the upstream end 26. More specifically, when the projection line 14A of the rotation shaft 14 intersects with the upstream end 26, the advantage of reducing the difference between the flow of intake air that has passed through a portion of the valve member 15 that is open toward the upstream side and the flow of intake air that has passed through a portion of the valve member 15 that is open toward the downstream side as the intake air flows through the connection pipe 21 and drawing the intake air into the surge tank is obtained.

In the first embodiment, the throttle valve 13 having the circular valve member 15 is used. The valve member of the throttle valve is not limited to a circular valve member. For example, a tetragonal valve member may be used as the valve member of a throttle valve. The shape of the throttle valve 413 may be modified in the same manner as the throttle valve 13.

The first embodiment shows an example in which the throttle valve 13 includes the rotation shaft 14 located in a position extending through the center of the valve member 15. Instead, the rotation shaft 14 may be configured to extend through a position deviated from the center of the valve member 15. The position of the rotation shaft 414 of the throttle valve 413 may be changed in the same manner as the throttle valve 13.

In the first embodiment, the throttle valve 13 and the partition plate 25 are arranged so that the projection line 14A of the rotation shaft 14 of the throttle valve 13 intersects with the upstream end 26 of the partition plate 25 in the center of the cross section of the flow passage in the connection pipe 21. However, the positional relationship between the throttle valve and the partition plate is not limited to the relationship described above. For example, the throttle valve 13 and the partition plate 25 may be arranged so that the projection line 14A intersects with the upstream end 26 in a position deviated from the center. The position of the throttle valve 413 relative to the partition plate may be changed in the same manner as the throttle valve 13.

The first embodiment shows an example in which the right bank 91A is the first bank and the left bank 91B is the second bank. Instead, in an internal combustion engine in which multiple cylinders are divided and arranged in two banks, the left bank 91B may be the first bank, and the right bank 91A may be the second bank. In this case, the connection pipe 21 may be curved toward the left bank 91B from the portion that connects the connection pipe 21 and the tank 31.

The terms, the right bank and the left bank, are used for the sake of convenience. When the internal combustion engine is mounted on a vehicle, the first bank may be located, for example, at a front side of the vehicle, and the second bank may be located at a rear side of the vehicle.

The first embodiment shows an example in which the intake device 10 is used for a V-type internal combustion engine. The intake device of each embodiment is not limited to the use for a V-type internal combustion engine. The intake device may be used in a multi-cylinder internal combustion engine that includes an intake manifold and a surge tank.

The first embodiment shows an example in which an internal combustion engine includes six cylinders. However, as long as multiple cylinders are included, the internal combustion engine may include any number of cylinders.

In the first embodiment, the portion that connects the connection pipe 21 and the tank 31 includes the straight portion 23 extending in the extension direction C2. The straight portion 23 may be omitted from the embodiments. More specifically, the connection pipe 21 may be connected to the tank 31 so that the entrance angle of intake air flowing from the connection pipe 21 to the convergence portion 32 is inclined from the extension direction C2.

In the first embodiment, the connection pipe 21 is U-shaped, and the flow passage configured by the connection pipe 21 changes the flow direction of intake air 180°. In the embodiments, the shape of the connection pipe configuring a curved flow passage is not limited to U. For example, a curved shape that changes the flow direction of intake air 90° may be used.

In the first embodiment, the connection pipe 21 includes the curved portion 22 that is gently curved. Instead, in the embodiments, instead of including the curved portion, the connection portion may include a bent portion that bends the flow passage.

In the first embodiment, the connection pipe 21 is connected to the inlet 34 that is open in the upper wall 33 of the tank 31. In the embodiments, as long as the connection pipe is connected to one side of the tank 31 in the extension direction C2, the connection pipe may be connected to, for example, a side wall of the tank 31 including the convergence portion 32.

The first embodiment shows an example of the surge tank unit 20 in which the connection pipe 21 and the tank 31 are integrally molded. Instead, the surge tank unit 20 may be separated into a component configuring the connection pipe 21 and a component configuring the tank 31, and these components may be combined to configure the surge tank unit 20. The same applies to the second and third embodiments.

In the first embodiment, the terminal portion 27 of the partition plate 25 extends in the extension direction C2. However, the terminal portion 27 of the partition plate 25, which is located adjacent to the tank 31, does not necessarily have to extend in the extension direction C2. More specifically, in the embodiments, when the shape of the terminal portion does not cause disturbance of the flow of intake air, the partition plate regulates the flow of intake air passing through the connection pipe.

In the first embodiment, the flow passage configured by the connection pipe is divided by the partition plate 25 into two flow passages, namely, the circumferentially inner flow passage 28 and the circumferentially outer flow passage 29. In the embodiments, the number of flow passages divided by a partition plate is not limited to two. For example, two partition plates may be provided to divide the flow passage configured by the connection pipe into a circumferentially inner flow passage, a circumferentially outer flow passage, and a center flow passage located between the circumferentially inner flow passage and the circumferentially outer flow passage.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An intake device used for an internal combustion engine including multiple cylinders, wherein the intake device configures a flow passage for intake air that is drawn into combustion chambers of the internal combustion engine, the intake device comprising:
    an intake manifold configuring multiple runners that distribute intake air to each of the multiple cylinders;
    a surge tank including a cavity that is connected to the runners, the cavity defining a convergence portion;
    a throttle body incorporating a throttle valve; and
    a connection pipe connecting the surge tank and the throttle body to each other and configuring a curved flow passage extending between the throttle body and the surge tank,
    wherein the connection pipe includes a partition plate that divides the curved flow passage into a circumferentially inner flow passage and a circumferentially outer flow passage, the circumferentially inner flow passage being located inside the circumferentially outer flow passage in a radial direction of the curved flow passage, and
    wherein the partition plate is curved along the curved flow passage and includes a curved concave surface and an opposite curved convex surface, the circumferentially inner flow passage is located radially inside the curved concave surface, and the circumferentially outer flow passage is located radially outside the curved convex surface.

2. The intake device according to claim 1, wherein
    each of the runners includes a connection portion connected to the convergence portion,
    the connection portions are spaced apart from each other in an extension direction of a rotation axis of a crankshaft of the internal combustion engine,
    the connection pipe includes a straight portion connected to an end of the surge tank in the extension direction of the rotation axis and extending in the extension direction of the rotation axis,
    the partition plate includes a terminal portion extending in the extension direction of the rotation axis and located at an end of the connection pipe that is located adjacent to the surge tank, and
    the terminal portion is located in the straight portion.

3. The intake device according to claim 2, wherein
    the internal combustion engine is a V-type internal combustion engine in which the multiple cylinders are separated into a first bank and a second bank and arranged in a V-shaped layout,
    the surge tank and the intake manifold are arranged between the first bank and the second bank,
    the flow passage in the connection pipe is curved toward the first bank at an upstream side of the straight portion, and
    the runners include
    a first bank runner connected to the convergence portion at a position closer to the first bank than a portion of the surge tank connected to the connection pipe, the first bank runner distributing intake air to one of the cylinders in the first bank, and
    a second bank runner connected to the convergence portion at a position closer to the second bank than the portion of the surge tank connected to the connection pipe, the second bank runner distributing intake air to one of the cylinders in the second bank.

4. The intake device according to claim 1, wherein
    the throttle valve is a butterfly valve and includes a rotation shaft, and
    when the rotation shaft of the throttle valve is projected along the flow passage for intake air onto an end of the partition plate that is opposed to the throttle valve, a projection line of the rotation shaft intersects with the end of the partition plate.

5. The intake device according to claim 4, wherein
    the throttle valve includes a circular valve member, and
    the projection line of the rotation shaft is orthogonal to the end of the partition plate.

6. The intake device according to claim 1, wherein
    the throttle valve is a butterfly valve,
    when the flow passage in the connection pipe is divided into two regions, which are a first pipe inner region and a second pipe inner region excluding the first pipe inner region, by an imaginary plane that intersects with the partition plate, the first pipe inner region is a region in which when opening the throttle valve from a fully-closed state, a valve member of the throttle valve is inclined toward an upstream side of the flow passage for intake air, and
    in the first pipe inner region, in a range of a specified dimension from an end of the partition plate that is opposed to the throttle valve toward a downstream side of intake air, the partition plate divides the flow passage in the connection pipe into the circumferentially inner flow passage and the circumferentially outer flow passage.

7. The intake device according to claim 6, wherein
    the partition plate includes a basal end connected to an inner wall of the connection pipe configuring the first pipe inner region and a distal end opposite to the basal end, a dimension of the partition plate from the basal end to the distal end is less than an inner diameter of the connection pipe in a direction connecting the basal end and the distal end, the distal end of the partition plate is located in the second pipe inner region, and in the second pipe inner region, in a range of a specified dimension from an end of the partition plate that is opposed to the throttle valve toward a downstream side of intake air, in the connection pipe, the circumferentially inner flow passage and the circumferentially outer flow passage located at opposite sides of the partition plate are connected to each other through a gap between an inner wall of the connection pipe and the distal end of the partition plate.

8. The intake device according to claim 6, wherein the partition plate is a second partition plate, the second partition plate projects from the inner wall of the connection pipe configuring the first pipe inner region, the intake device further comprises a first partition plate projecting from an inner wall of the connection pipe configuring the second pipe inner region, wherein the first partition plate includes a distal end opposed to the distal end of the second partition plate, the first partition plate and the second partition plate divide the curved flow passage in the connection pipe into a circumferentially inner flow passage and a circumferentially outer flow passage, the distal end of the first partition plate and the distal end of the second partition plate are located in the second pipe inner region, and in the second pipe inner region, in a range of a specified dimension from an end of the partition plate that is opposed to the throttle valve toward a downstream side of intake air, in the connection pipe, the circumferentially inner flow passage and the circumferentially outer flow passage, which are located opposite sides of the first partition plate and the second partition plate, are connected to each other through a gap between the distal end of the first partition plate and the distal end of the second partition plate.

9. The intake device according to claim 1, wherein the throttle valve is a slide valve including a valve member including a valve hole, when the throttle valve is fully open, the throttle valve has a region in which the flow passage in the connection pipe is blocked by the valve member of the throttle valve and a region in which the flow passage in the connection pipe is not blocked by the valve member, when a boundary between the regions defines a boundary plane and the boundary plane is projected along the flow passage for intake air onto an end of the partition plate that is opposed to the throttle valve, a projection line of the boundary plane intersects with the end of the partition plate, the partition plate is connected to an inner wall of the connection pipe configuring a region of the flow passage that is not blocked by the valve member when the throttle valve is fully open, the partition plate includes a basal end connected to the inner wall and a distal end opposite to the basal end, and in a range of the connection pipe having a specified dimension from the end of the partition plate that is opposed to the throttle valve toward a downstream side of intake air, a dimension of the partition plate from the basal end to the distal end is greater than a distance from the basal end to the projection line of the boundary plane in a direction connecting the basal end and the distal end.

10. The intake device according to claim 1, wherein the throttle valve is a slide valve including a valve member including a valve hole, when the flow passage in the connection pipe is divided into two regions, which are a first pipe inner region and a second pipe inner region, by an imaginary plane that intersects with the partition plate and extends through a center axis of the connection pipe, the first pipe inner region is a region in which when the valve member is moved to open the throttle valve from a fully closed state, a flow passage located at an upstream side of the throttle valve starts to be connected to a flow passage located at a downstream side of the throttle valve, the second pipe inner region is a region opposite to the first pipe inner region with respect to the imaginary plane, and in the first pipe inner region, in a range of a specified dimension from an end of the partition plate that is opposed to the throttle valve toward a downstream side of intake air, the flow passage in the connection pipe is divided by the partition plate into the circumferentially inner flow passage and the circumferentially outer flow passage.

11. The intake device according to claim 10, wherein the partition plate includes a basal end connected to an inner wall of the connection pipe configuring the first pipe inner region and a distal end opposite to the basal end, a dimension of the partition plate from the basal end to the distal end is less than an inner diameter of the connection pipe in a direction connecting the basal end and the distal end, the distal end of the partition plate is located in the second pipe inner region, and in the second pipe inner region, in a range of a specified dimension from an end of the partition plate that is opposed to the throttle valve toward a downstream side of intake air, in the connection pipe, the circumferentially inner flow passage and the circumferentially outer flow passage located at opposite sides of the partition plate are connected to each other through a gap between an inner wall of the connection pipe and the distal end of the partition plate.

* * * * *